US012202115B2

(12) United States Patent
Dedrickson et al.

(10) Patent No.: US 12,202,115 B2
(45) Date of Patent: Jan. 21, 2025

(54) ROTARY POWER TOOL INCLUDING TRANSMISSION HOUSING BUSHING

(71) Applicant: MILWAUKEE ELECTRIC TOOL CORPORATION, Brookfield, WI (US)

(72) Inventors: Ryan A. Dedrickson, Sussex, WI (US); Ian Allen Duncan, Milwaukee, WI (US); Tian Yu, Dongguan (CN); Jian Wei Li, Dongguan (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/939,031

(22) Filed: Sep. 7, 2022

(65) Prior Publication Data

US 2023/0017720 A1 Jan. 19, 2023

Related U.S. Application Data

(63) Continuation of application No. 17/477,762, filed on Sep. 17, 2021, now Pat. No. 11,440,173, which is a (Continued)

(51) Int. Cl.

*B25D 16/00* (2006.01)
*B25D 11/10* (2006.01)
(Continued)

(52) U.S. Cl.

CPC .......... *B25D 16/006* (2013.01); *B25D 11/106* (2013.01); *B25D 16/003* (2013.01); (Continued)

(58) Field of Classification Search

CPC .. B25D 16/006; B25D 16/003; B25D 17/043; B25D 2216/0023; B25D 2216/0038; (Continued)

(56) References Cited

U.S. PATENT DOCUMENTS

| | | | | |
|---|---|---|---|---|
| 3,511,321 A * | 5/1970 | Schnettler | B25D 16/00 173/171 |
| 4,479,555 A * | 10/1984 | Grossmann | B25D 17/20 173/171 |

(Continued)

FOREIGN PATENT DOCUMENTS

| | | |
|---|---|---|
| CN | 105245058 A | 1/2016 |
| CN | 205141921 U | 4/2016 |

(Continued)

*Primary Examiner* — Michelle Lopez

(74) *Attorney, Agent, or Firm* — Michael Best & Friedrich LLP

(57) ABSTRACT

A rotary power tool comprises a drive mechanism including an electric motor and a transmission, a housing enclosing at least a portion of the drive mechanism, a spindle rotatable in response to receiving torque from the drive mechanism, a first ratchet coupled for co-rotation with the spindle, a second ratchet rotationally fixed to the housing, a sleeve bushing supported by the housing, and a bearing rotatably supporting the spindle. The spindle has an outer race. And, the outer race of the bearing moves along the sleeve bushing during reciprocation of the spindle when the first ratchet and second ratchet are engaged.

18 Claims, 15 Drawing Sheets

Related U.S. Application Data continuation of application No. 16/360,585, filed on Mar. 21, 2019, now Pat. No. 11,148,273.

(60) Provisional application No. 62/650,741, filed on Mar. 30, 2018.

(51) Int. Cl.
*B25B 21/02* (2006.01)
*B25D 17/04* (2006.01)

(52) U.S. Cl.
CPC ............ *B25B 21/026* (2013.01); *B25D 17/04* (2013.01); *B25D 2216/0023* (2013.01); *B25D 2216/0038* (2013.01); *B25D 2216/0084* (2013.01); *B25D 2250/005* (2013.01); *B25D 2250/095* (2013.01); *B25D 2250/121* (2013.01); *B25D 2250/165* (2013.01); *B25D 2250/221* (2013.01); *B25D 2250/265* (2013.01); *B25D 2250/321* (2013.01); *B25D 2250/331* (2013.01); *B25D 2250/335* (2013.01)

(58) Field of Classification Search
CPC .... B25D 2216/0069; B25D 2216/0084; B25D 2250/165; B25D 2250/221
See application file for complete search history.

(56) References Cited

U.S. PATENT DOCUMENTS

| | | | |
|---|---|---|---|
| 5,458,206 | A | 10/1995 | Bourner et al. |
| 5,505,271 | A | 4/1996 | Bourner |
| 6,661,148 | B2 | 12/2003 | Oomori et al. |
| 6,691,796 | B1 | 2/2004 | Wu |
| 7,878,772 | B2 | 2/2011 | Rexhauser et al. |
| 7,969,050 | B2 | 6/2011 | Zhang |
| 8,096,857 | B2 | 1/2012 | Hofmann et al. |
| 9,844,869 | B2 | 12/2017 | Ullrich et al. |
| 9,908,228 | B2 | 3/2018 | Elger |
| 10,737,373 | B2 | 8/2020 | Duncan et al. |
| 11,148,273 | B2 | 10/2021 | Dedrickson et al. |
| 2007/0138902 | A1 | 6/2007 | Ahn et al. |
| 2012/0111594 | A1 | 5/2012 | Herr |
| 2020/0331136 | A1 | 10/2020 | Duncan et al. |

FOREIGN PATENT DOCUMENTS

| | | | | |
|---|---|---|---|---|
| DE | 2110015 | B2 | 10/1975 | |
| DE | 2941355 | A1 | 4/1981 | |
| DE | 102014225945 | A1 | 6/2016 | |
| EP | 2803449 | A1 | 11/2014 | |
| GB | 1376823 | A | 12/1974 | |
| WO | WO-2016066745 | A2 * | 5/2016 | ............. B29C 45/16 |

* cited by examiner

ROTARY POWER TOOL INCLUDING TRANSMISSION HOUSING BUSHING

CROSS-REFERENCE TO RELATED APPLICATIONS

This application is a continuation of U.S. patent application Ser. No. 17/477,762 filed on Sep. 17, 2021, now U.S. Pat. No. 11,440,173, which is a continuation of U.S. patent application Ser. No. 16/360,585 filed on Mar. 21, 2019, now U.S. Pat. No. 11,148,273, which claims priority to U.S. Provisional Patent Application No. 62/650,741 filed on Mar. 30, 2018, the entire contents of all of which are incorporated herein by reference.

FIELD OF THE INVENTION

The present invention relates to rotary power tools, and more particularly to rotary power tools with reciprocating spindles.

BACKGROUND OF THE INVENTION

Some power tools include a spindle that reciprocates while rotating in a housing. The spindle is sometimes supported by a bearing that moves along the housing as the spindle reciprocates.

SUMMARY OF THE INVENTION

The present invention provides, in one aspect, a rotary power tool comprising a drive mechanism including an electric motor and a transmission, a housing enclosing at least a portion of the drive mechanism, a spindle rotatable in response to receiving torque from the drive mechanism, a first ratchet coupled for co-rotation with the spindle, a second ratchet rotationally fixed to the housing, a sleeve bushing supported by the housing, and a bearing rotatably supporting the spindle. The spindle has an outer race. And, the outer race of the bearing moves along the sleeve bushing during reciprocation of the spindle when the first ratchet and second ratchet are engaged.

The present invention provides, in another aspect, a rotary power tool comprising a drive mechanism including an electric motor and a transmission, a housing enclosing at least a portion of the drive mechanism, the housing including an annular portion, a spindle rotatable in response to receiving torque from the drive mechanism, a first ratchet coupled for co-rotation with the spindle, a second ratchet rotationally fixed to the housing, a sleeve bushing disposed between the spindle and the housing, and a bearing rotatably supporting the spindle. The spindle is movable relative to the annular portion of the housing in response to contact with a workpiece, causing the first and second ratchets to engage and the spindle to reciprocate while rotating. The bearing moves along the sleeve bushing during reciprocation of the spindle when the first ratchet and the second ratchet are engaged.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
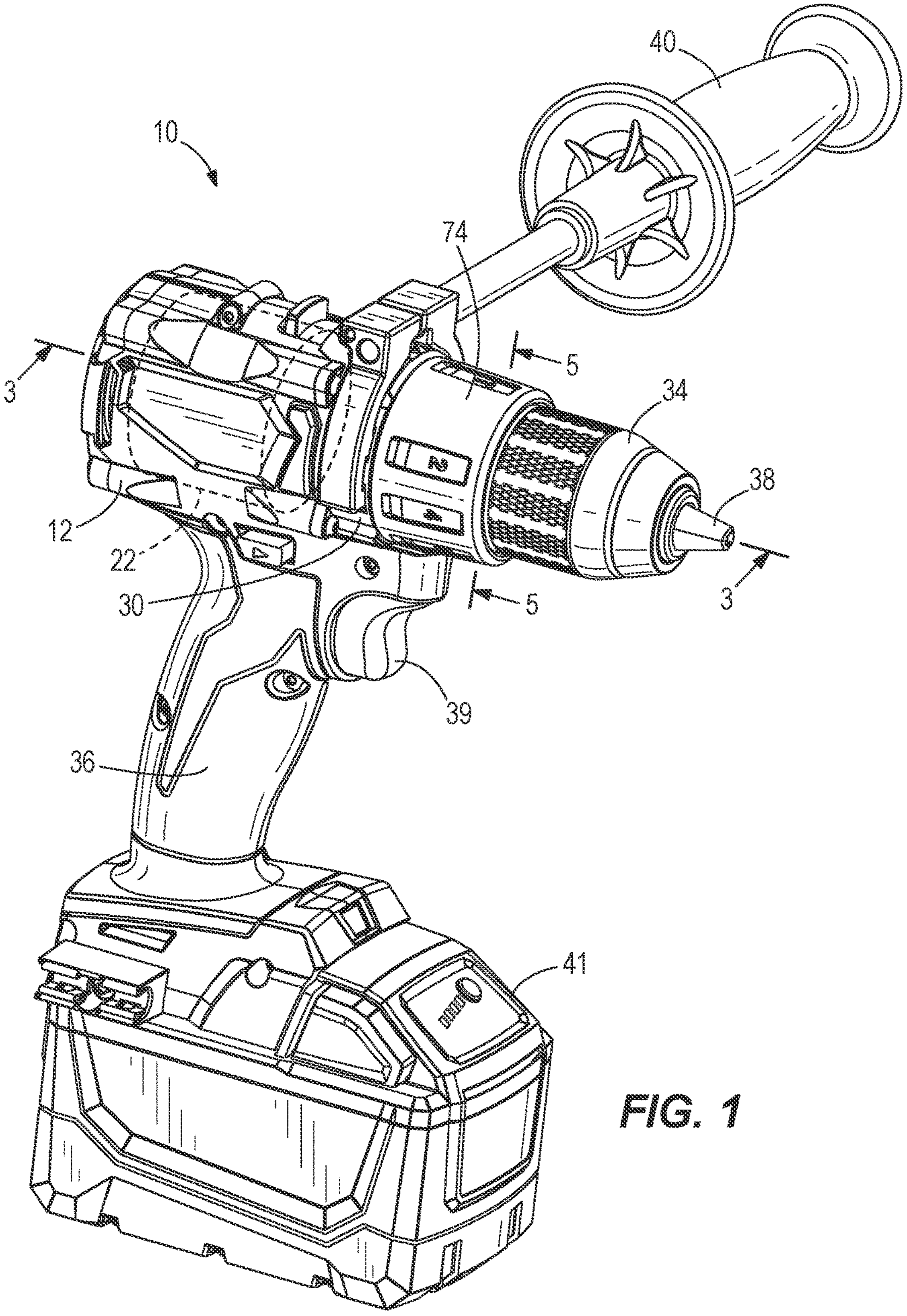
FIG. 1 is a perspective view of a portion of a hammer drill in accordance with an embodiment of the invention.
Figure 2:
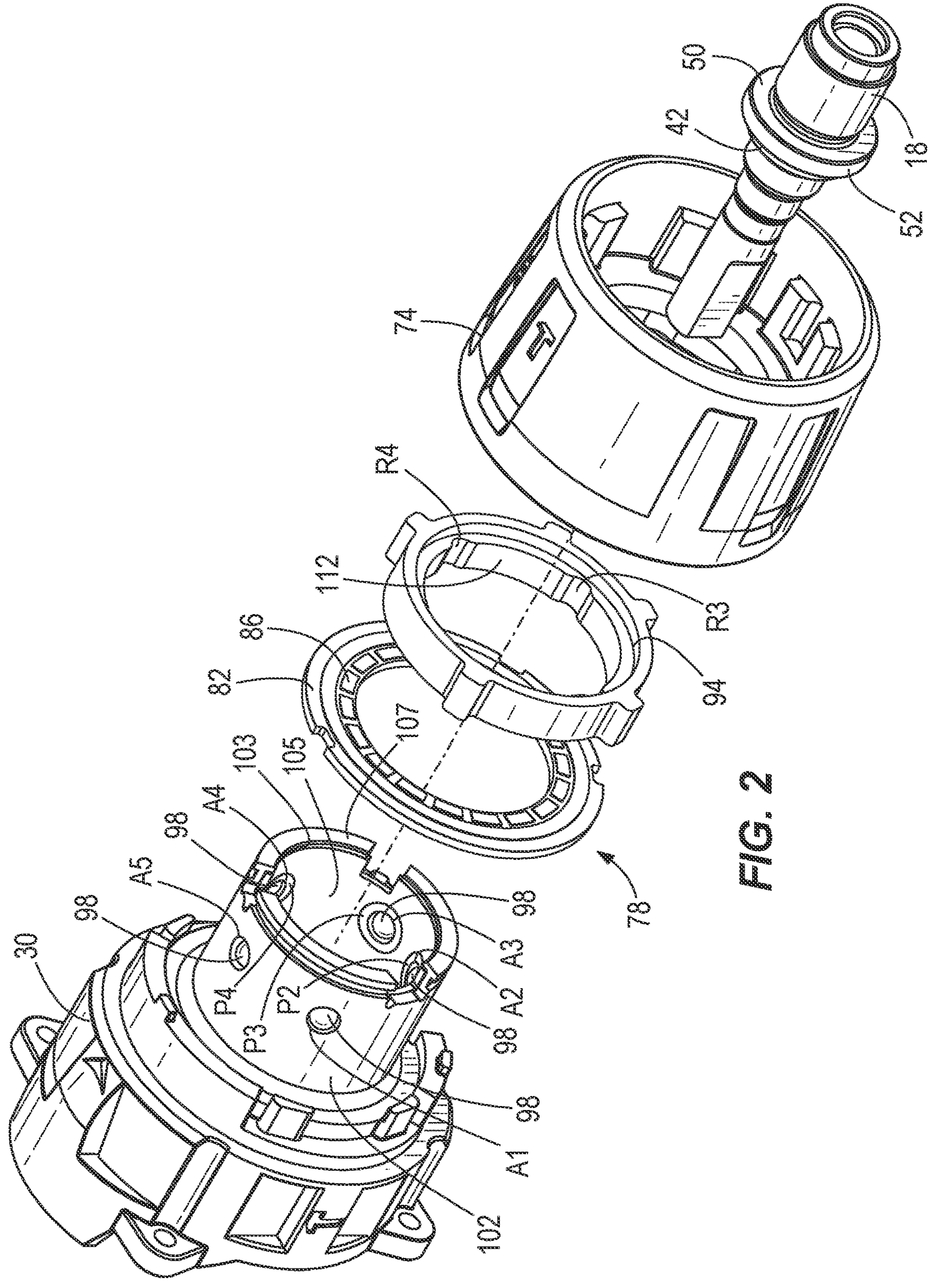
FIG. 2 is an enlarged, exploded view of a front portion of the hammer drill of FIG. 1, with a collar rendered transparent to illustrate a selector ring.
Figure 3:
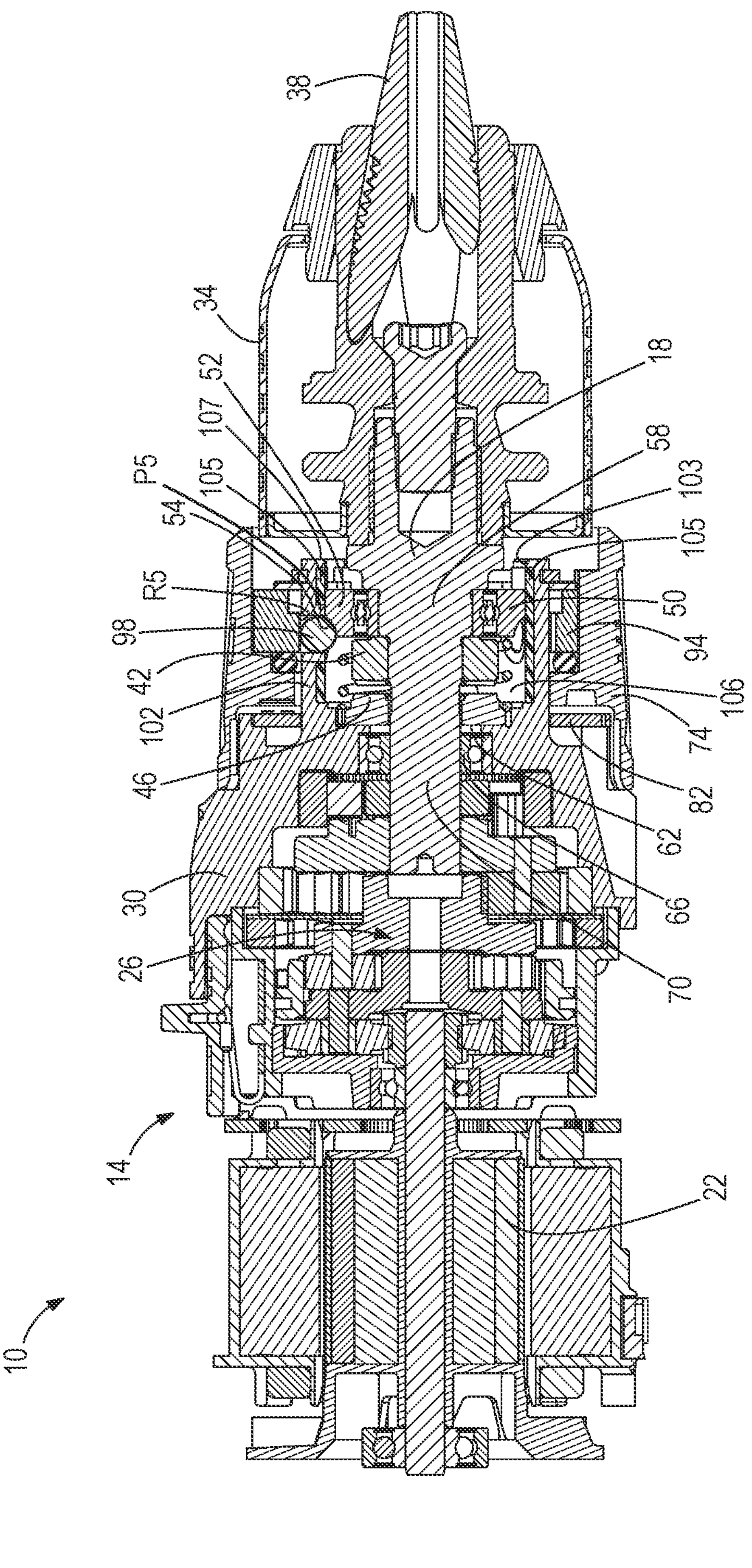
FIG. 3 is a longitudinal cross-sectional view of the hammer drill of FIG. 1.

As shown in FIGS. 1-3, a rotary power tool, in this embodiment a hammer drill 10, includes a housing 12, a drive mechanism 14 and a spindle 18 rotatable in response to receiving torque from the drive mechanism 14. As shown in FIG. 3, the drive mechanism 14 includes an electric motor 22 and a multi-speed transmission 26 between the motor 22 and the spindle 18. The drive mechanism 14 is at least partially enclosed by a transmission housing 30. As shown in FIGS. 1 and 3, a chuck 34 is provided at the front end of the spindle 18 so as to be co-rotatable with the spindle 18. The chuck 34 includes a plurality of jaws 38 configured to secure a tool bit or a drill bit (not shown), such that when the drive mechanism 14 is operated, the bit can perform a rotary and/or percussive action on a fastener or workpiece. The hammer drill 10 includes a pistol grip handle 36, a trigger 39 for activating the motor 22, and an auxiliary handle 40 that can be selectively removed from the transmission housing 30. The hammer drill 10 may be powered by an on-board power source such as a battery 41 or a remote power source (e.g., an alternating current source) via a cord (not shown).

Figure 4:
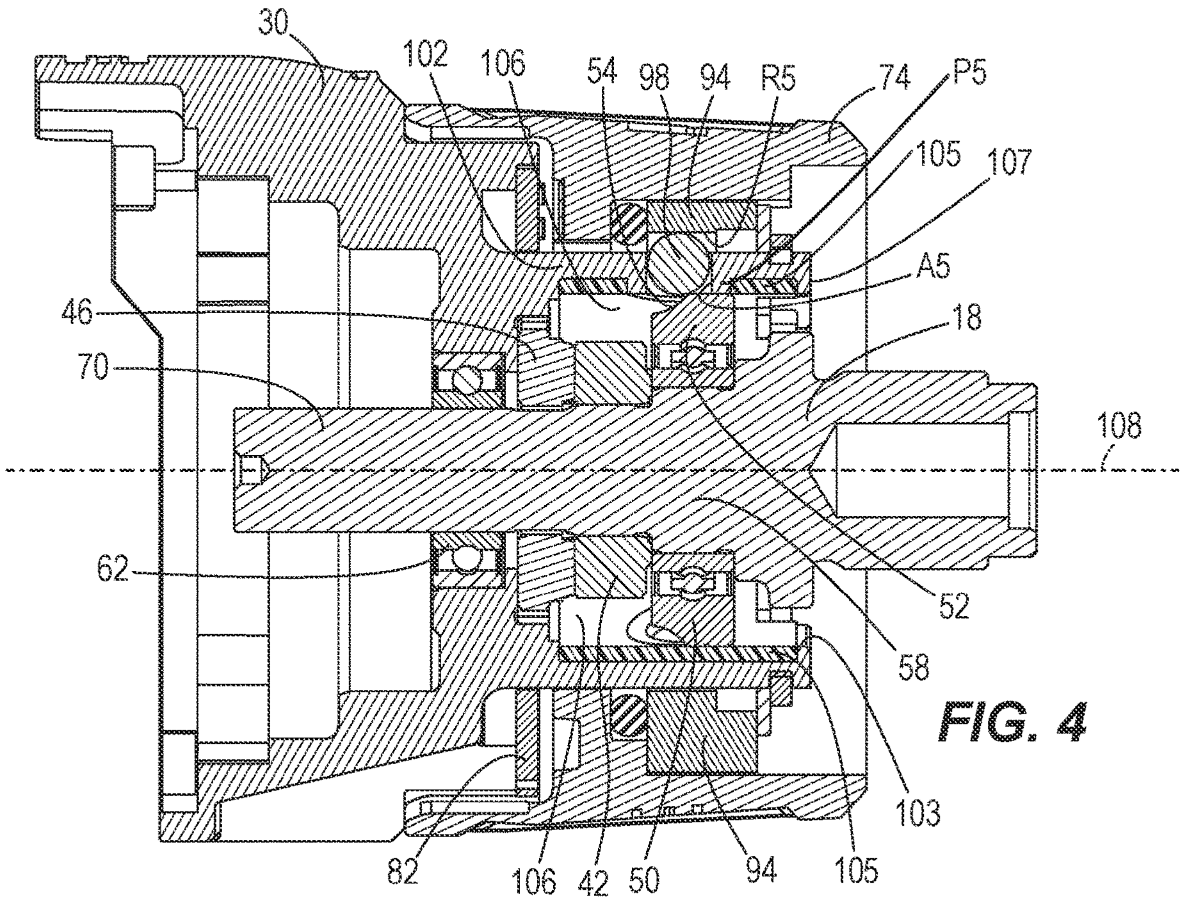
FIG. 4 is an enlarged view of the hammer drill of FIG. 3, with portions removed, illustrating a hammer lock-out mechanism in a disabled mode.
Figure 6:
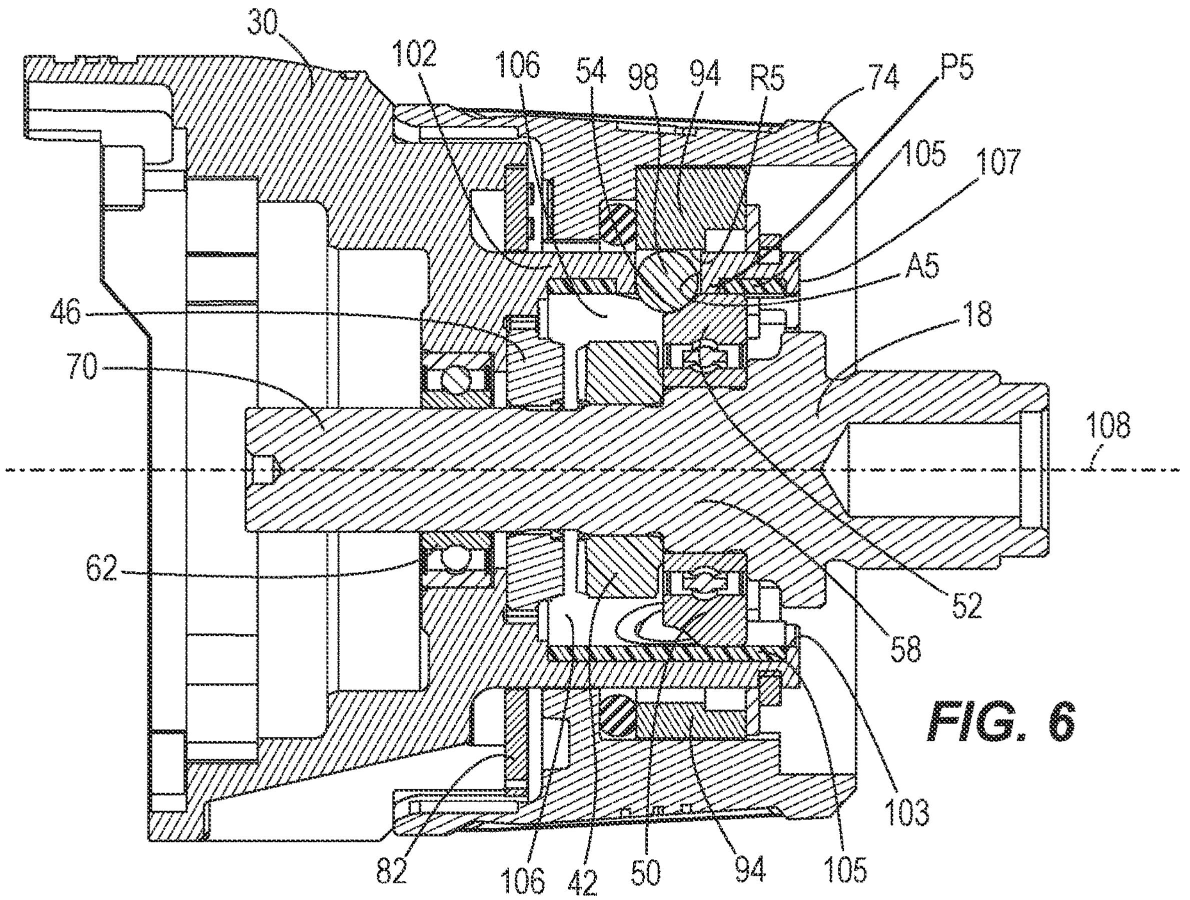
FIG. 6 is an enlarged view of the hammer drill of FIG. 3, with portions removed, illustrating the hammer lock-out mechanism in an enabled mode.

With reference to FIGS. 2 and 3, the hammer drill 10 includes a first ratchet 42 coupled for co-rotation with the spindle 18 and a second ratchet 46 axially and rotationally fixed to the transmission housing 30. In other embodiments, the second ratchet 46 is rotationally fixed, but axially moveable relative to the transmission housing 30. As shown in FIGS. 3, 4 and 6, a first bearing 50 with an outer race 52 having an edge 54 is radially positioned between the transmission housing 30 and the spindle 18 and supports a front portion 58 of the spindle 18. In the illustrated embodiment, the edge 54 is chamfered, but in other embodiments, In other embodiments, the chamfered edge 54 is a part separate from the outer race 52. In other embodiments, the As shown in FIG. 3, the second ratchet 46 includes a bearing pocket 62 defined in a rear end of the second ratchet 46. A second bearing 66 is at least partially positioned in the bearing pocket 62 and supports a rear portion 70 of the spindle 18. In the illustrated embodiment, the second bearing 66 is wholly received in the bearing pocket 62, but in other embodiments the second bearing 66 may at least partially extend from the bearing pocket 62. By incorporating the bearing pocket 62 in the second ratchet 46, the second bearing 66 is arranged about the rear portion 70 of the spindle 18 in a nested relationship within the second ratchet 46, thereby reducing the overall length of the hammer drill 10 while also supporting rotation of the spindle 18.

With reference to FIGS. 1-7, the hammer drill 10 includes a collar 74 that is rotatably adjustable by an operator of the hammer drill 10 to shift between "hammer drill," "drill-only," and "screwdriver" modes of operation, and to select a particular clutch setting when in "screwdriver mode." Thus, the collar 74 is conveniently provided as a single collar that can be rotated to select different operating modes of the hammer drill 10 and different clutch settings. As shown in FIGS. 2 and 3, the hammer drill 10 also includes an electronic clutch 78 capable of limiting the amount of torque that is transferred from the spindle 18 to a fastener (i.e., when in "screwdriver mode") by deactivating the motor 22 in response to a detected torque threshold or limit. The electronic clutch 78 includes a printed circuit board ("PCB") 82 coupled to the transmission housing 30 and a wiper (not shown), which is coupled for co-rotation with the collar 74. The PCB 82 includes a plurality of electrical pads 86 which correspond to different clutch settings of the hammer drill 10.

The hammer drill 10 also includes a hammer lockout mechanism 90 (FIGS. 4-7) for selectively inhibiting the first and second ratchets 42, 46 from engaging when the hammer drill 10 is in a "screwdriver mode" or a "drill-only mode." The hammer lockout mechanism 90 includes a selector ring 94 coupled for co-rotation with and positioned inside the collar 74, and a plurality of balls 98 situated within corresponding radial apertures A1, A2, A3, A4, and A5 asymmetrically positioned around and extending through an annular portion 102 of the transmission housing 30.

As shown in FIGS. 3, 4, and 6, but not shown in FIG. 2, a sleeve bushing 105 is positioned on an inner surface 103 of the annular portion 102. The bushing 105 can be formed or secured along the inner surface 103 of the annular portion 102 in a variety of ways, including but not limited to insert molding, pressing, shrink fitting, or trapping with a retaining ring or screws. The annular portion 102 of the transmission housing 30 is formed of a relatively soft material including but not limited to aluminum or magnesium, whereas the bushing 105 is formed of a relatively harder material than aluminum or magnesium, including but not limited to steel. In some embodiments, the relatively softer material is below 20 HRC and the relatively harder material is equal to or above 20 HRC. In other embodiments, the relatively softer material is less is below 40 HRC and the relatively harder material is equal to or above 40 HRC.

Figure 26:
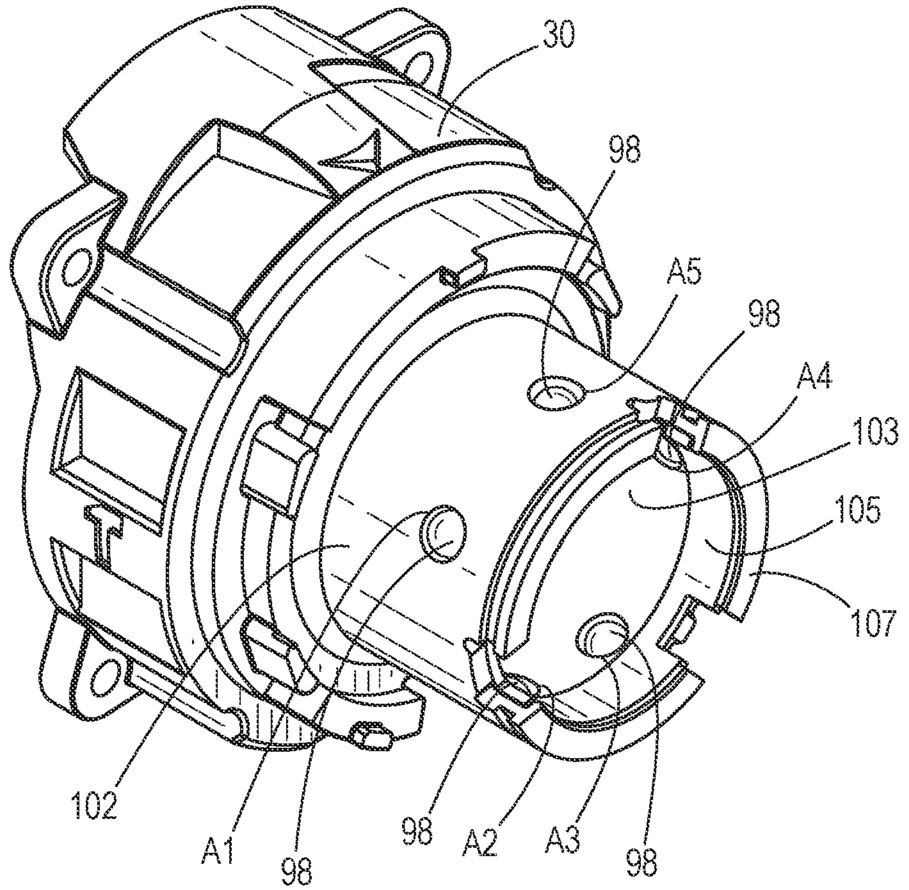
FIG. 26 is a prospective view of a transmission housing of the hammer drill of FIG. 1, according to another embodiment of the invention.

In the illustrated embodiment, the bushing 105 is located along the length of the inner surface 103 of the annular portion 102, which includes a plurality of radially inward-extending protrusions P1-P5 extending through sleeve bushing 105. The apertures A1-A5 respectively extend through the protrusions P1-P5 of the annular portion 102, such that the apertures A1-A5 are defined by the softer material forming the protrusions P1-P5 and the rest of annular portion 102. Specifically, the apertures A1-A5 extend from an inner end of the protrusions P1-P5 to an outer surface of the annular portion 102. In other embodiments, the protrusions P1-P5 are omitted and the apertures A1-A5 are at least partially defined by the sleeve bushing 105. In other embodiments, the protrusions P1-P5 are omitted and the bushing 105 can be located in front of the apertures A1-A5 (i.e., with the chuck 34 located at the front of the hammer drill 10), such that no portion of the bushing 105 intersects or overlaps the apertures A1-A5, as shown in FIG. 26. In some embodiments, the bushing 105 may extend forward along the inner surface 103 toward a distal end 107 of the annular portion 102, as shown in FIG. 26.

In the illustrated embodiment shown in FIGS. 4 and 6, only the ball 98 in aperture A5 is shown, but each of the other apertures A1, A2, A3, and A4 also contains a ball 98. As shown in FIGS. 2, 5 and 7-25, the selector ring 94 includes a plurality of recesses R1, R2, R3, R4, and R5 asymmetrically positioned about an inner periphery 112 of the selector ring 94. The number of recesses R1-R5 corresponds to the number of apertures A1-A5 and the number of balls 98 within the respective apertures A1-A5.

Figure 5:
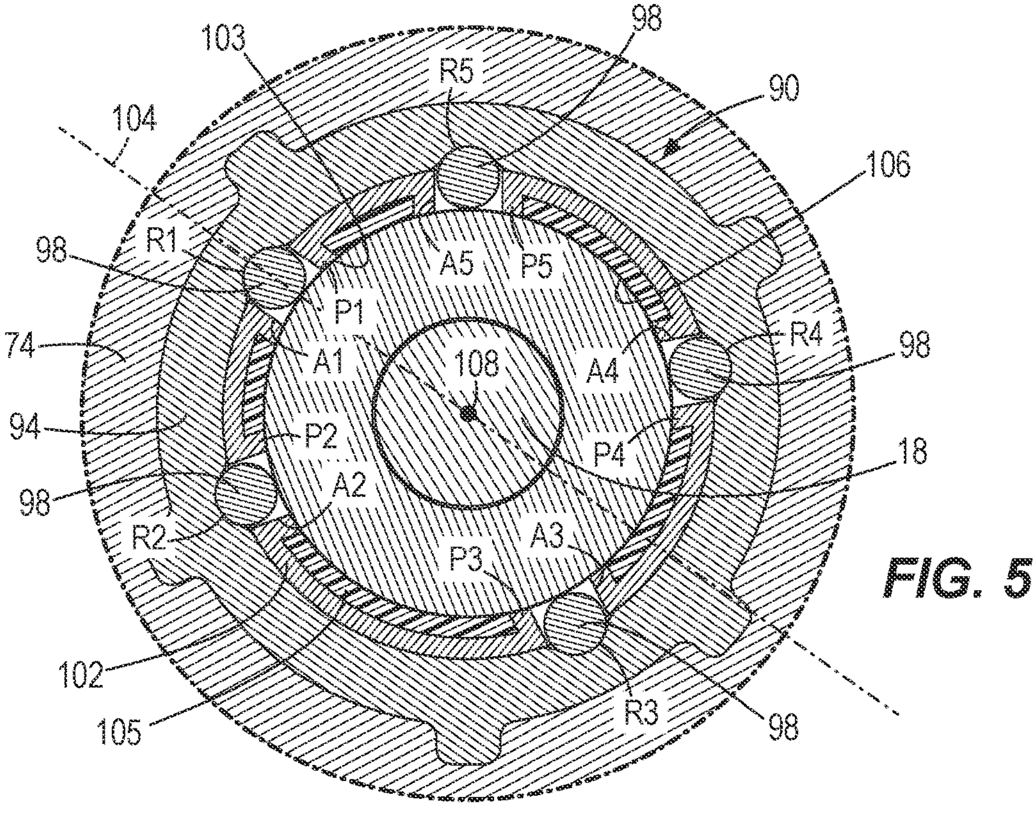
FIG. 5 is a lateral cross-sectional view of the hammer lock-out mechanism of FIG. 4 coinciding with a first rotational position of a collar of the hammer drill.
Figure 7:
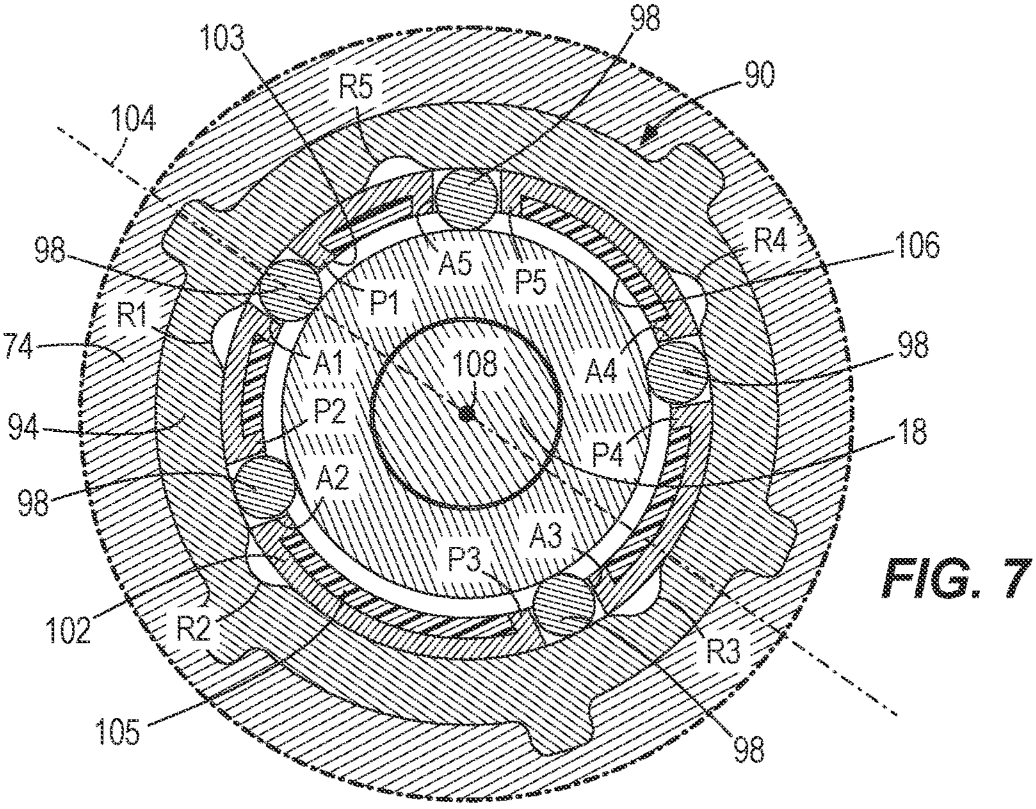
FIG. 7 is a lateral cross-sectional view of the hammer lock-out mechanism of FIG. 6 coinciding with a second rotational position of the collar.
Figure 8:
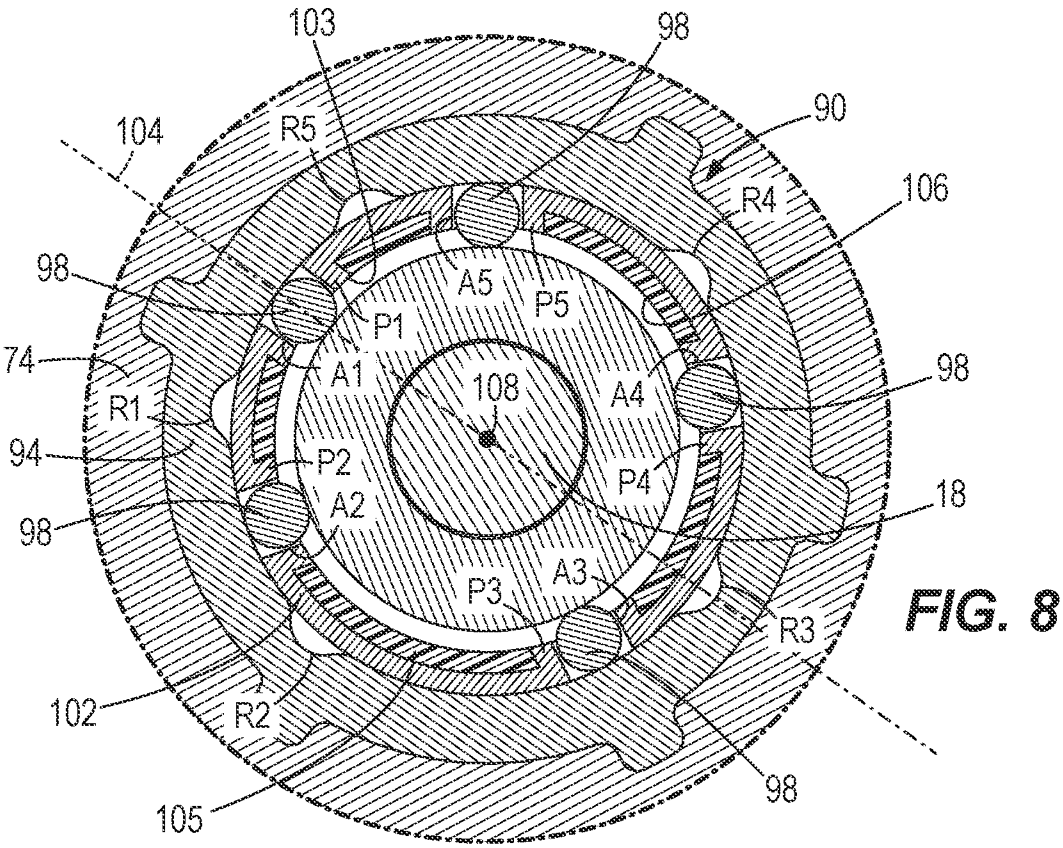
FIG. 8 is a lateral cross-sectional view of the hammer lock-out mechanism coinciding with a third rotational position of the collar.
Figure 9:
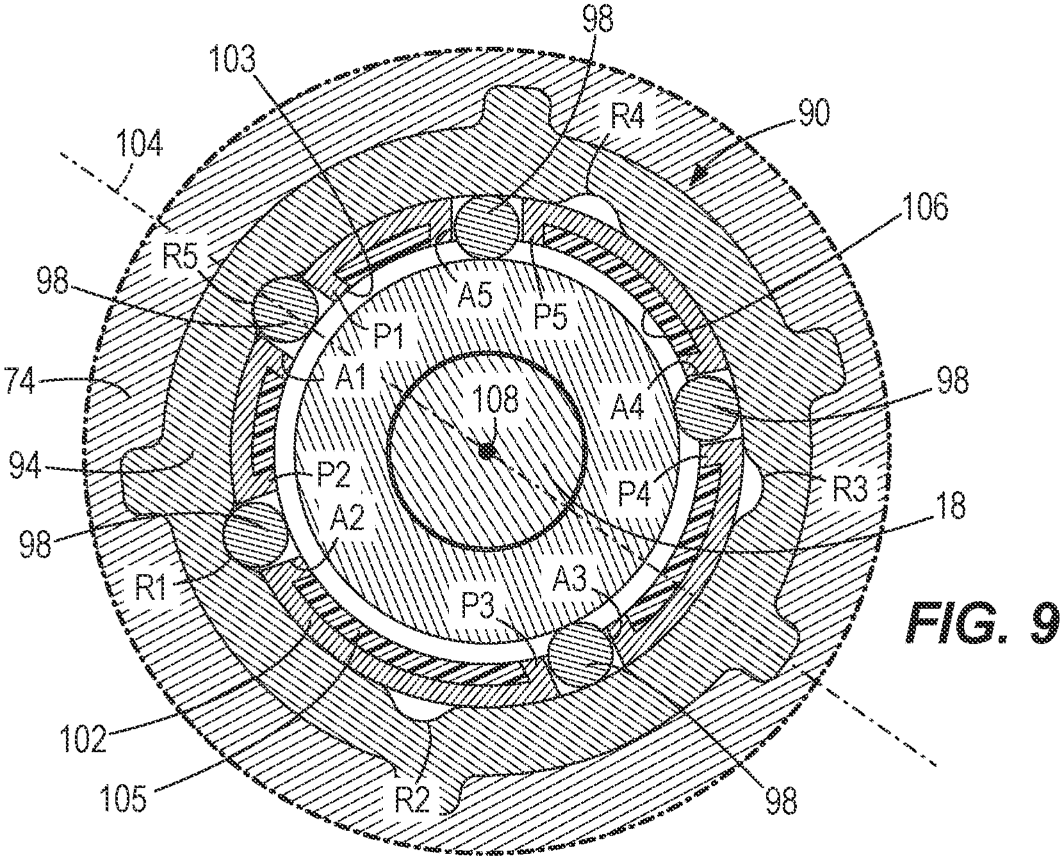
FIG. 9 is a lateral cross-sectional view of the hammer lock-out mechanism coinciding with a fourth rotational position of the collar.
Figure 10:
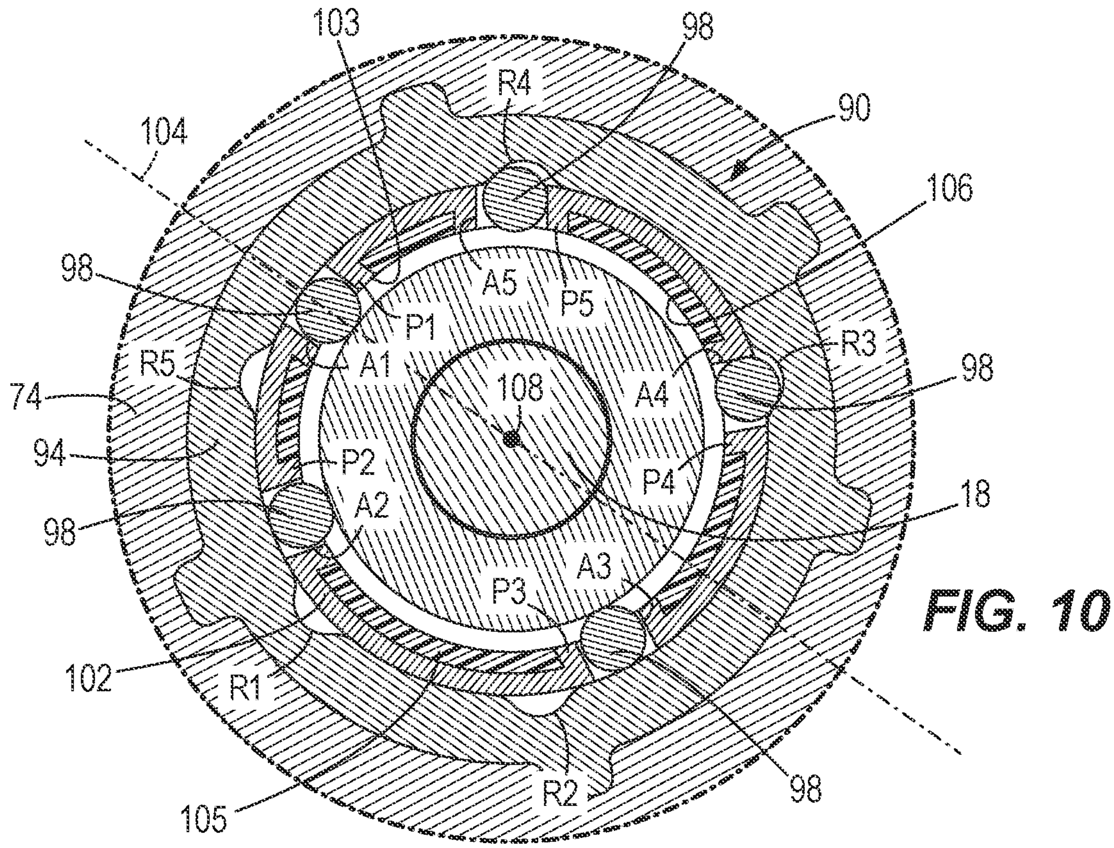
FIG. 10 is a lateral cross-sectional view of the hammer lock-out mechanism coinciding with a fifth rotational position of the collar.
Figure 11:
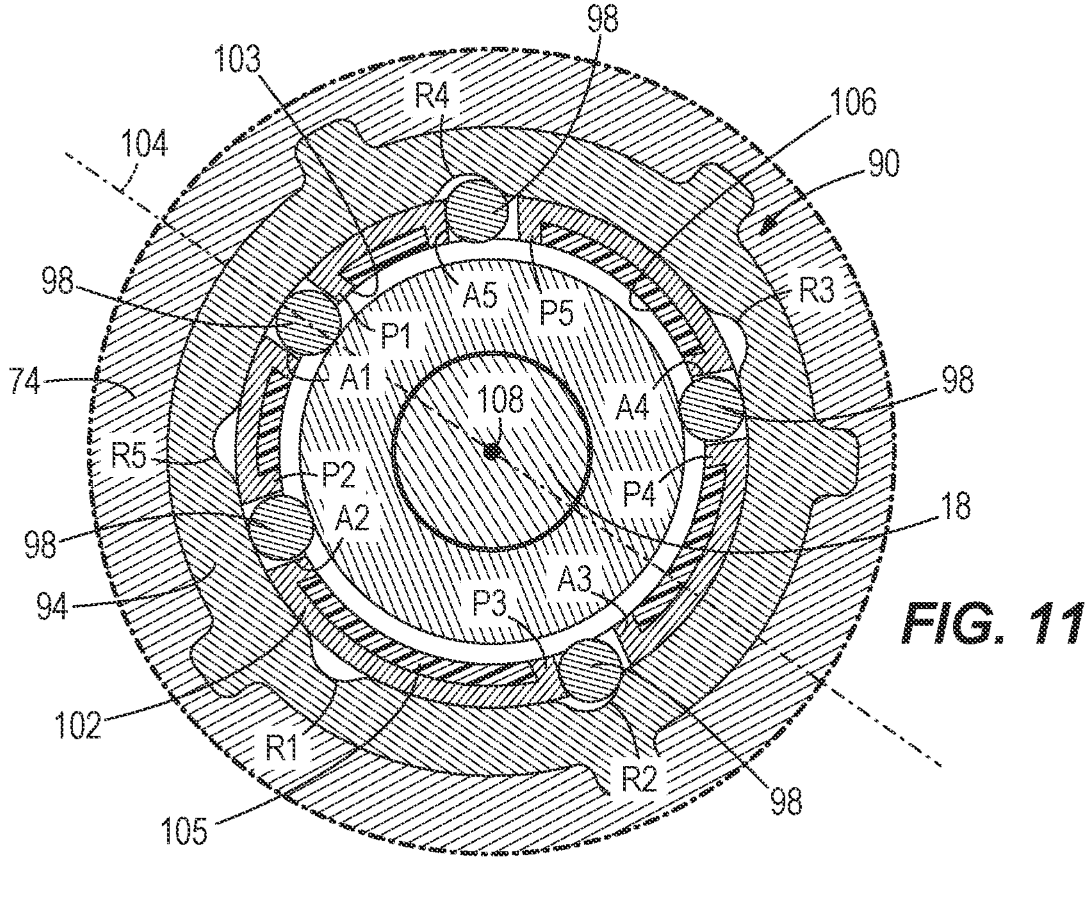
FIG. 11 is a lateral cross-sectional view of the hammer lock-out mechanism coinciding with a sixth rotational position of the collar.
Figure 12:
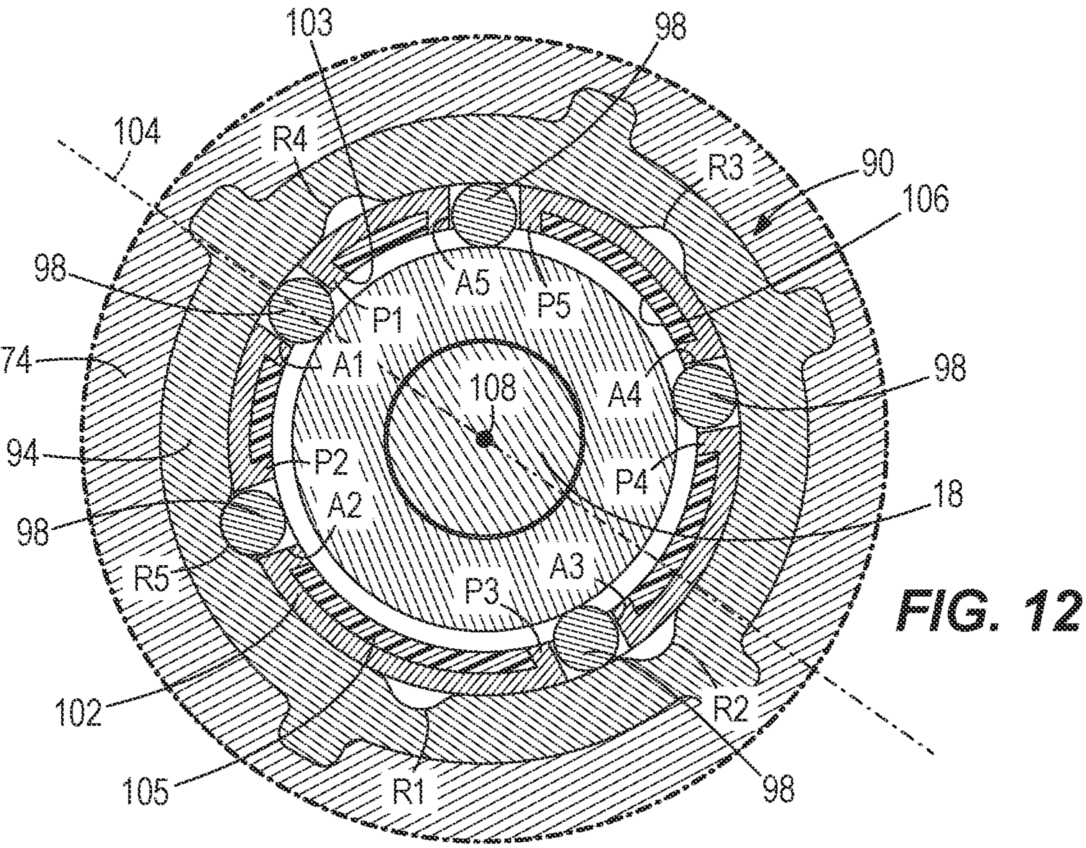
FIG. 12 is a lateral cross-sectional view of the hammer lock-out mechanism coinciding with a seventh rotational position of the collar.
Figure 13:
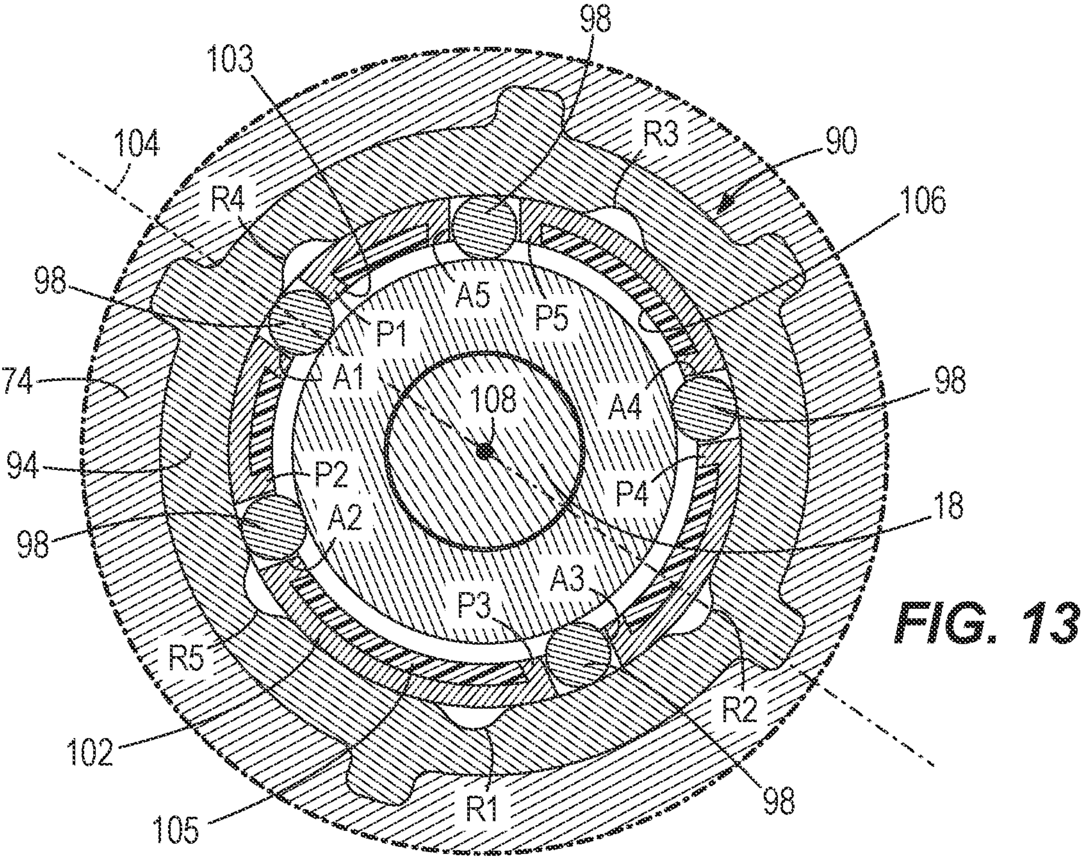
FIG. 13 is a lateral cross-sectional view of the hammer lock-out mechanism coinciding with an eighth rotational position of the collar.
Figure 14:
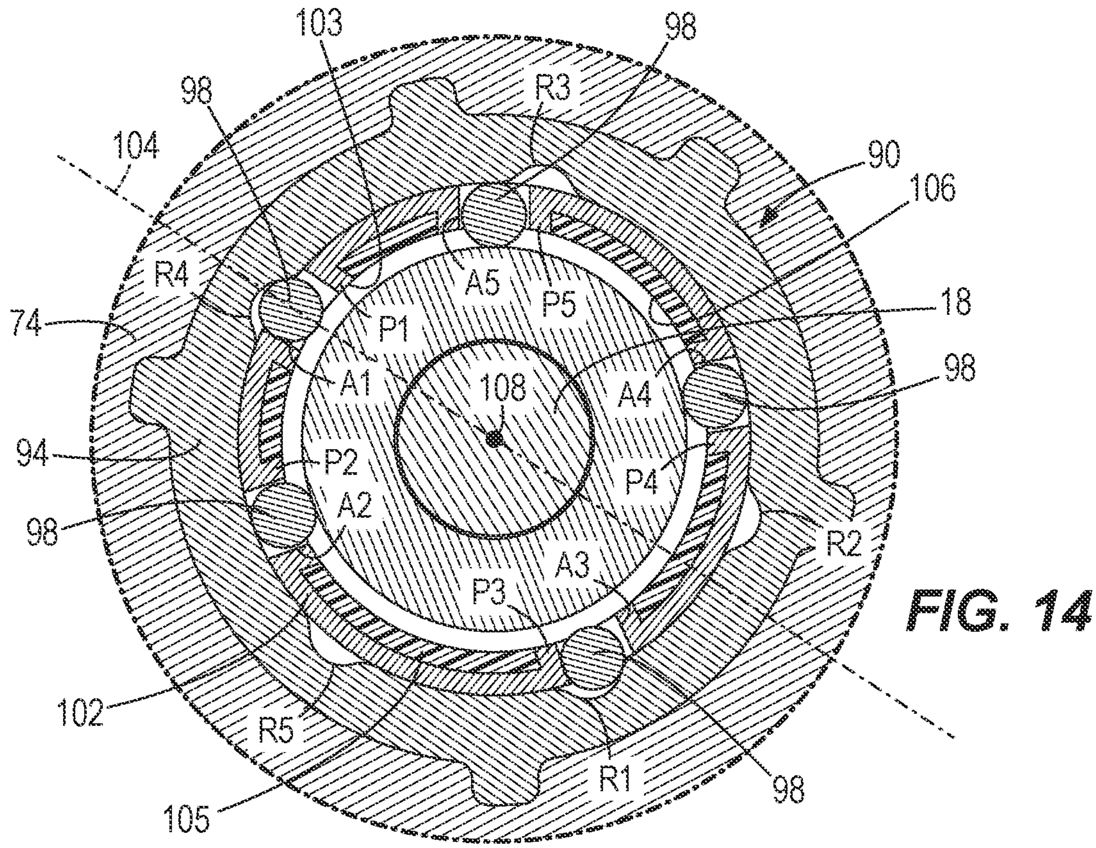
FIG. 14 is a lateral cross-sectional view of the hammer lock-out mechanism coinciding with a ninth rotational position of the collar.
Figure 15:
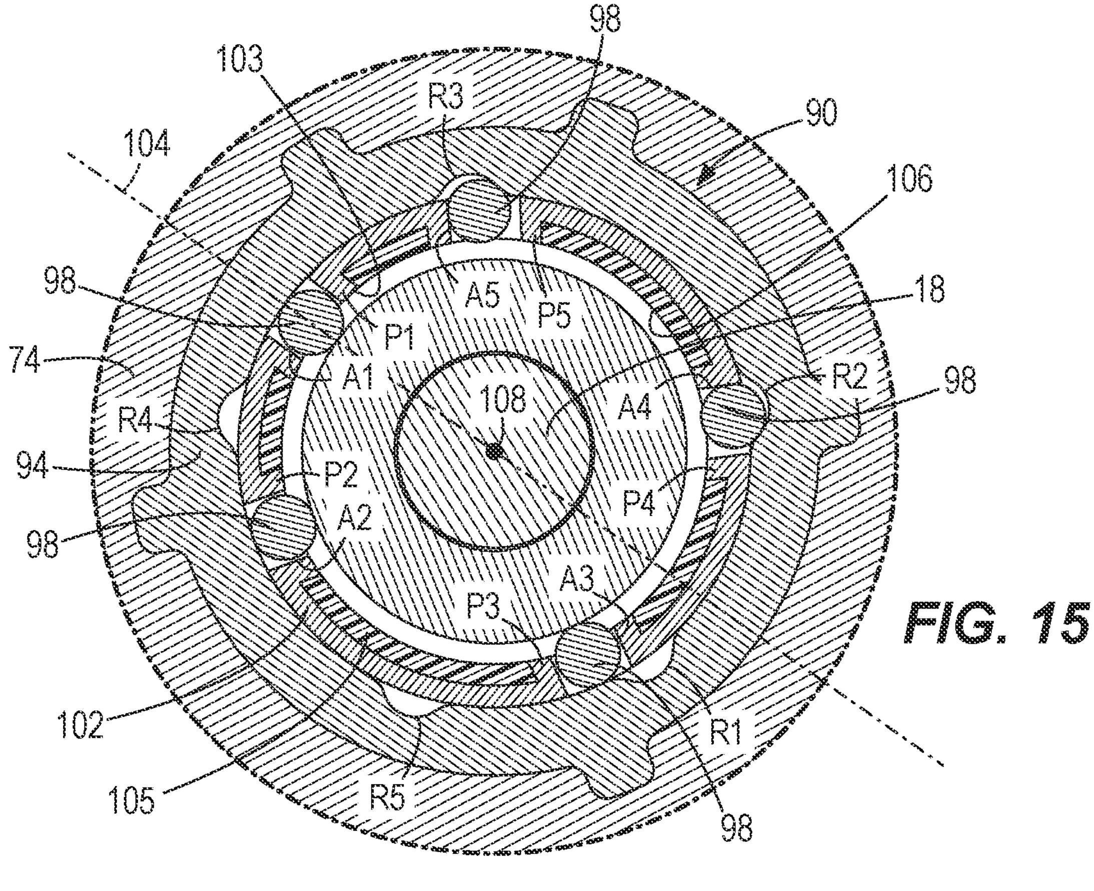
FIG. 15 is a lateral cross-sectional view of the hammer lock-out mechanism coinciding with a tenth rotational position of the collar.
Figure 16:
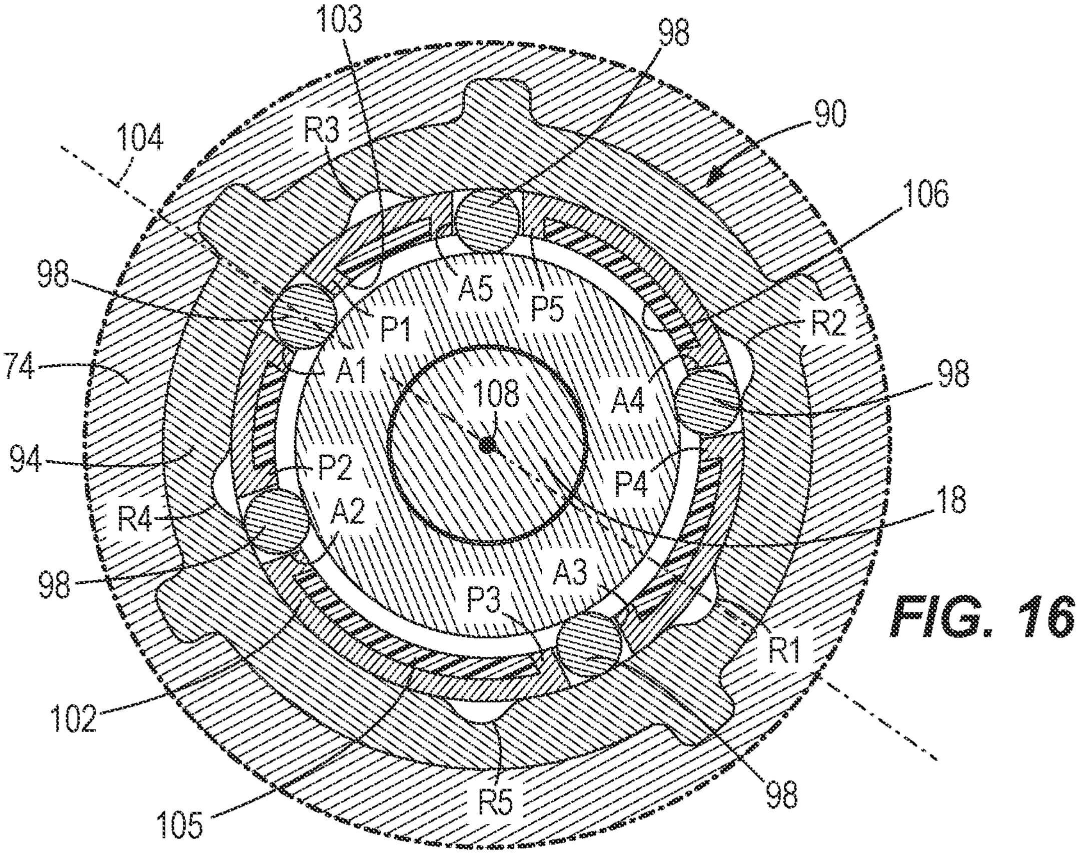
FIG. 16 is a lateral cross-sectional view of the hammer lock-out mechanism coinciding with a eleventh rotational position of the collar.
Figure 17:
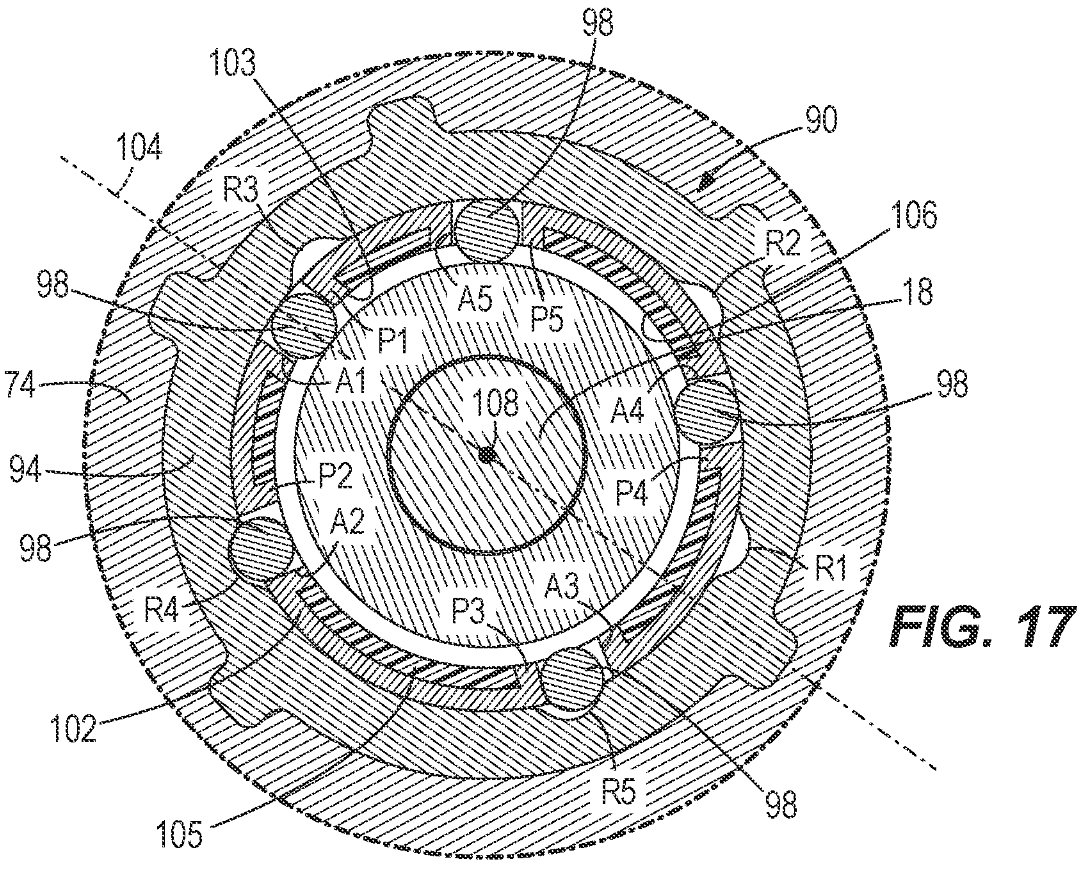
FIG. 17 is a lateral cross-sectional view of the hammer lock-out mechanism coinciding with a twelfth rotational position of the collar.
Figure 18:
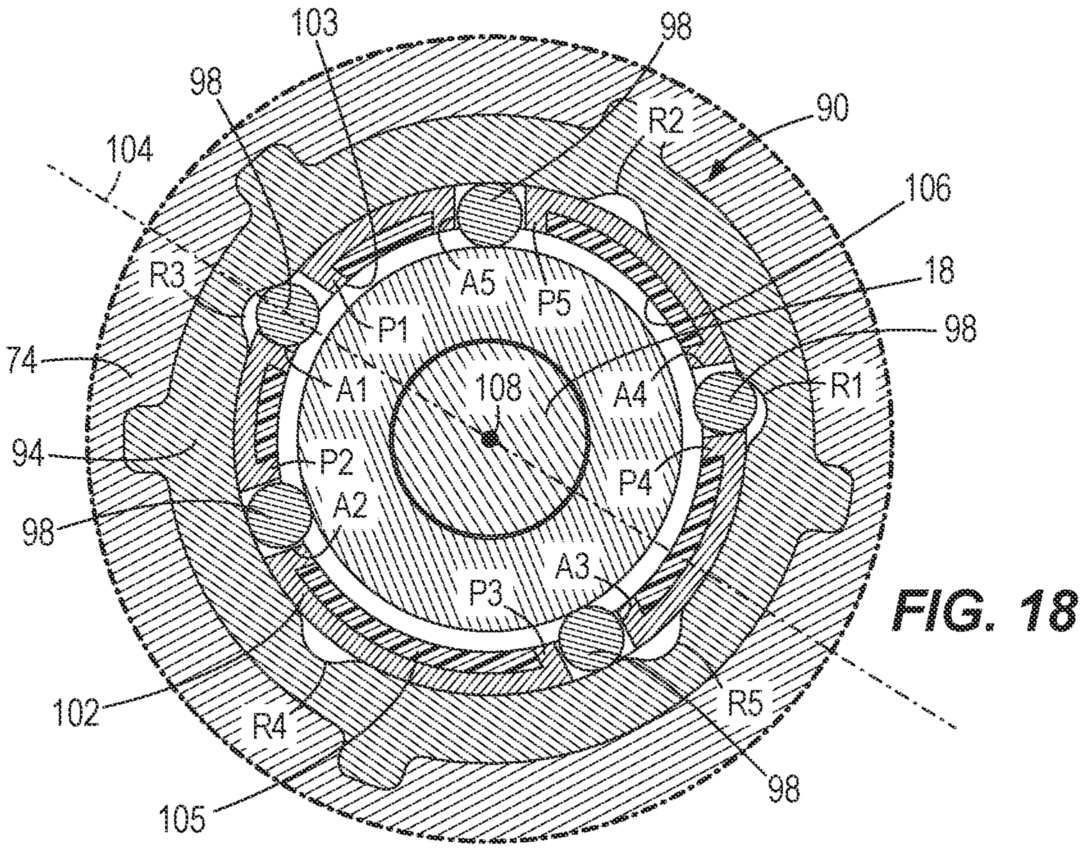
FIG. 18 is a lateral cross-sectional view of the hammer lock-out mechanism coinciding with a thirteenth rotational position of the collar.
Figure 19:
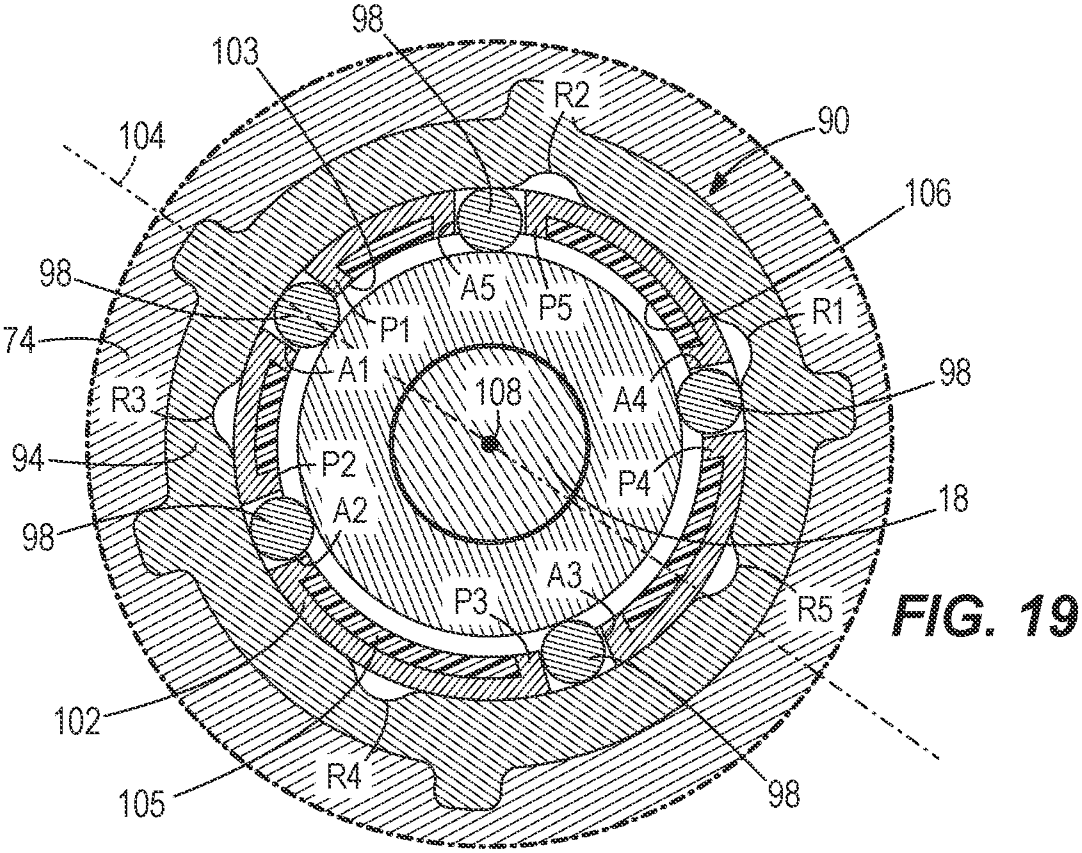
FIG. 19 is a lateral cross-sectional view of the hammer lock-out mechanism coinciding with a fourteenth rotational position of the collar.
Figure 20:
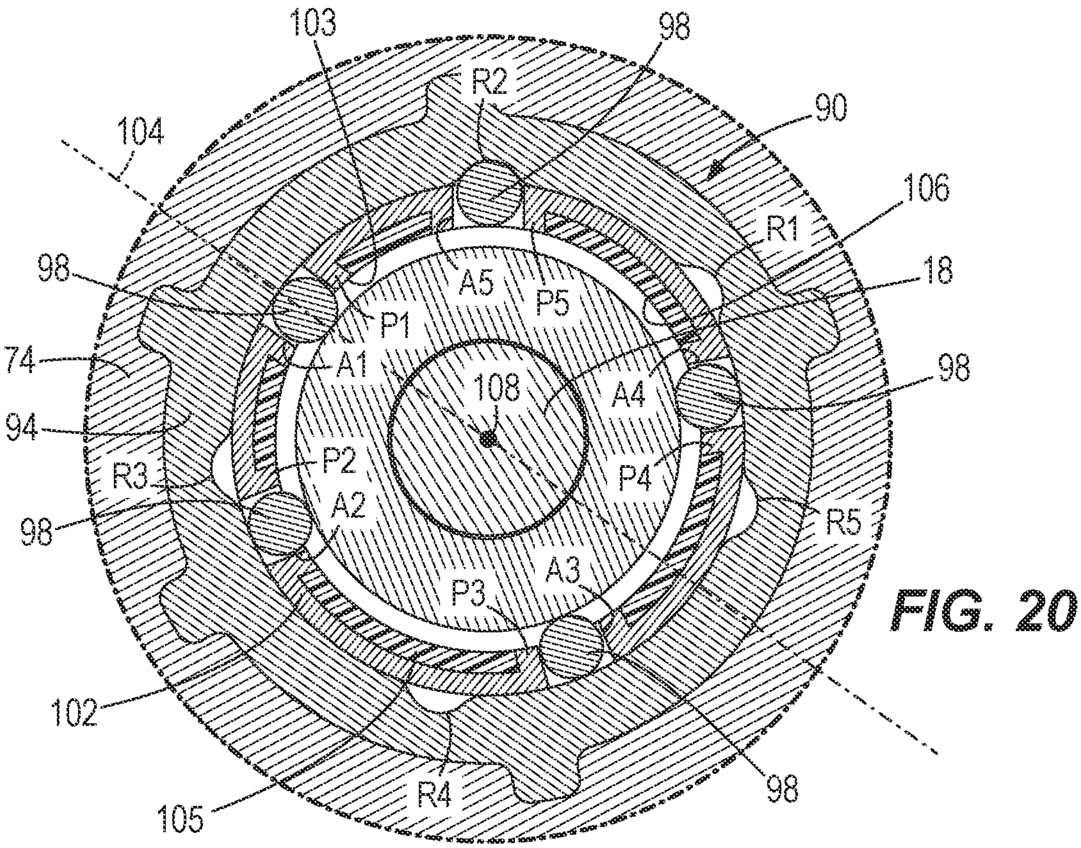
FIG. 20 is a lateral cross-sectional view of the hammer lock-out mechanism coinciding with a fifteenth rotational position of the collar.
Figure 21:
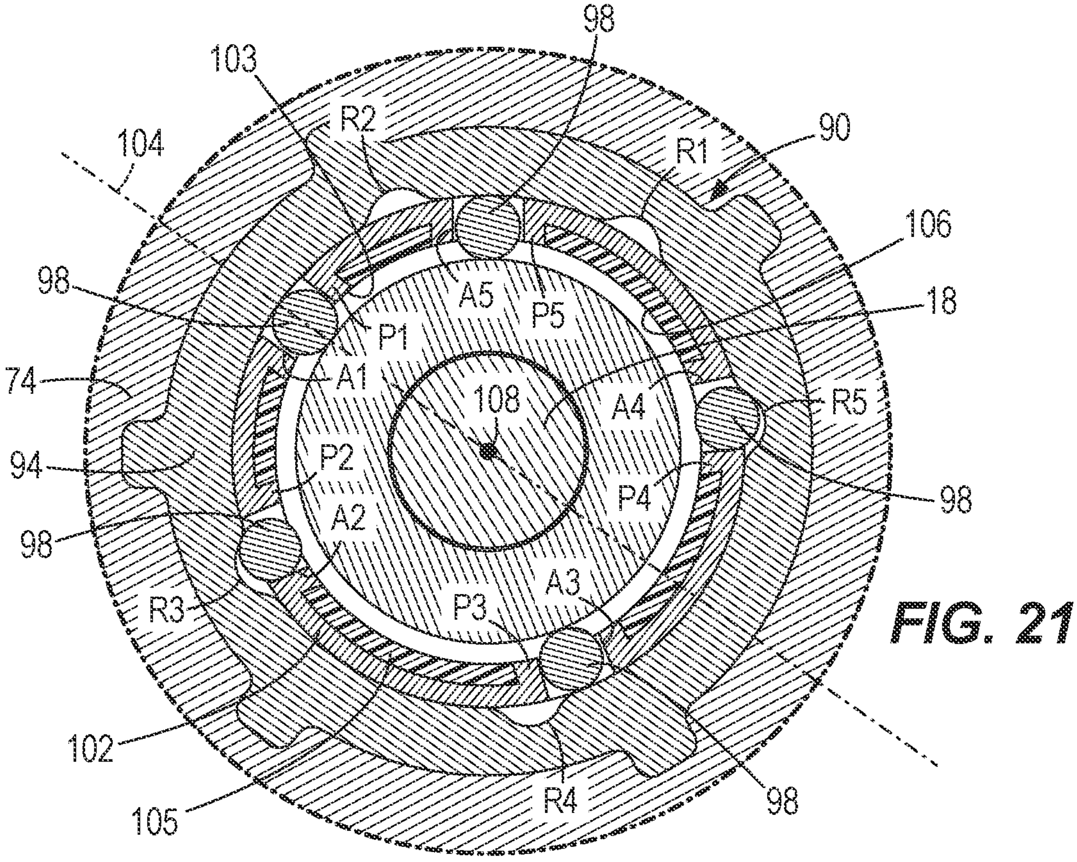
FIG. 21 is a lateral cross-sectional view of the hammer lock-out mechanism coinciding with a sixteenth rotational position of the collar.
Figure 22:
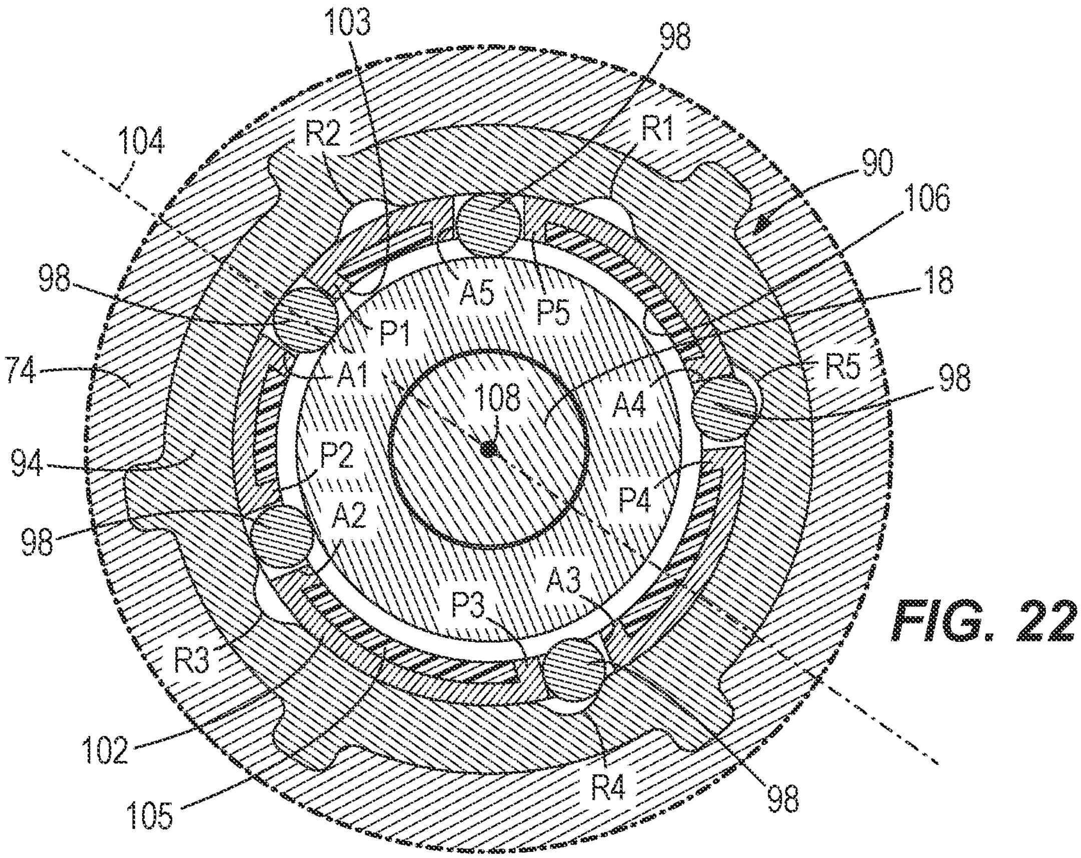
FIG. 22 is a lateral cross-sectional view of the hammer lock-out mechanism coinciding with a seventeenth rotational position of the collar.
Figure 23:
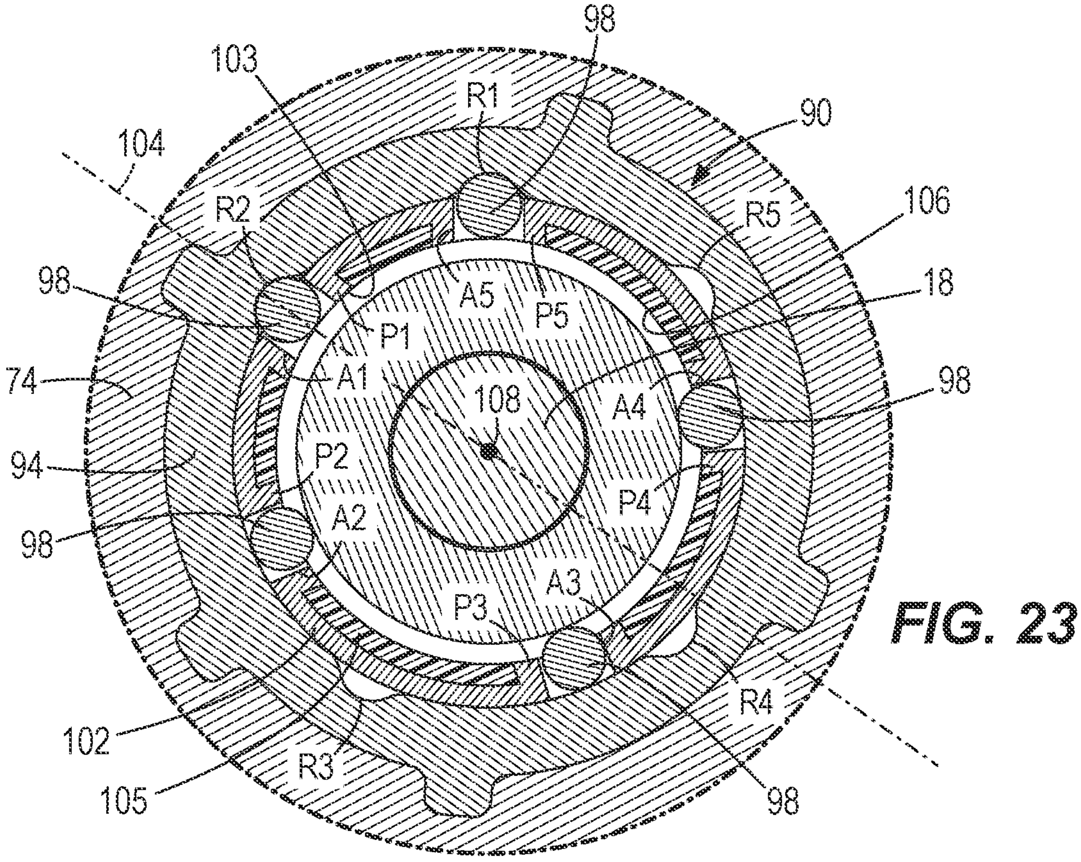
FIG. 23 is a lateral cross-sectional view of the hammer lock-out mechanism coinciding with a eighteenth rotational position of the collar.
Figure 24:
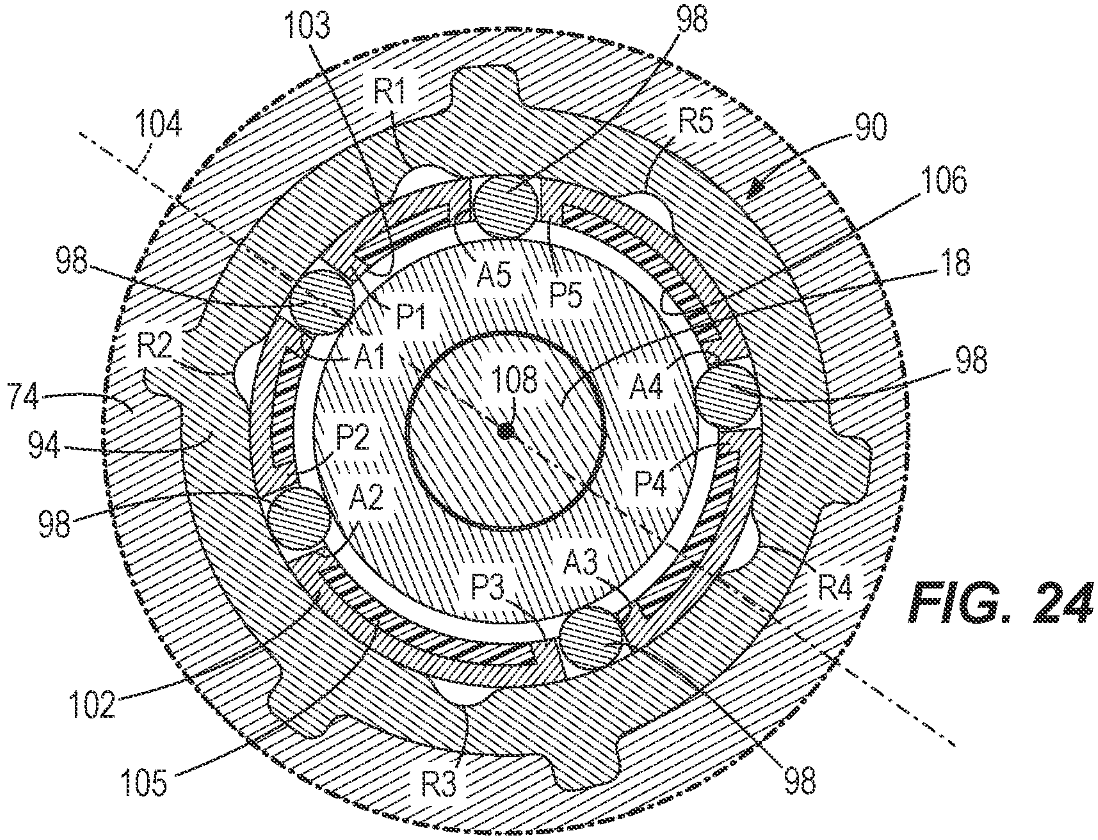
FIG. 24 is a lateral cross-sectional view of the hammer lock-out mechanism coinciding with a nineteenth rotational position of the collar.
Figure 25:
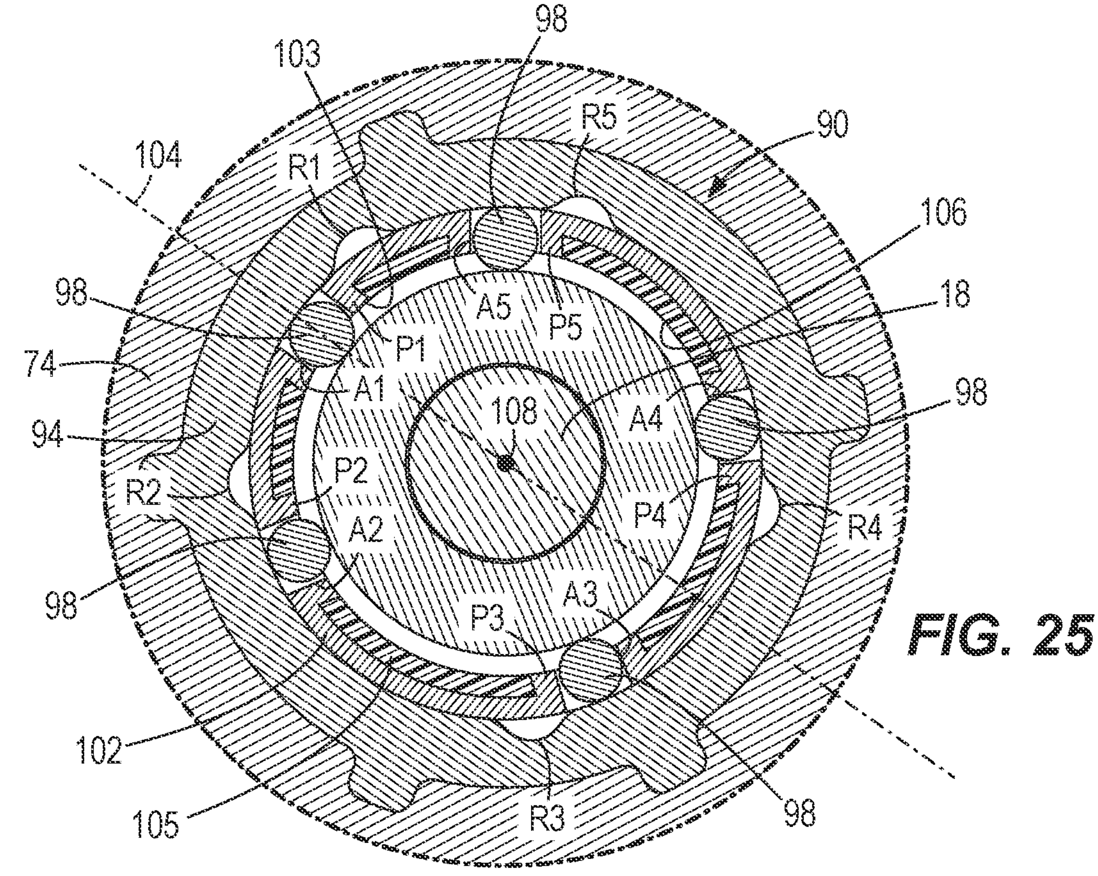
FIG. 25 is a lateral cross-sectional view of the hammer lock-out mechanism coinciding with a twentieth rotational position of the collar.

In the illustrated embodiment, five apertures A1-A5, each containing a ball 98, are located in the transmission housing 30 and five recesses R1-R5 are defined in the selector ring 94. However, in other embodiments, the hammer lockout mechanism 90 could employ more or fewer apertures, balls, and recesses. As shown in FIGS. 5 and 7, the five apertures A1-A5 are approximately located at 0 degrees, 55 degrees, 145 degrees, 221 degrees, and 305 degrees, respectively, measured in a counterclockwise direction from an oblique plane 104 containing a longitudinal axis 108 of the hammer drill 10 and bisecting aperture A1. As shown in FIGS. 4 and 6, the first ratchet 42 and the first bearing 50 are set within a cylindrical cavity 106 defined within the annular portion 102 of the transmission housing 30, and the selector ring 94 is radially arranged between the annular portion 102 and the collar 74, surrounding the apertures A1-A5.

In operation, as shown in FIGS. 4 and 5 when the collar 74 and ring 94 are rotated together to a position corresponding to a "hammer drill" mode, all five apertures A1-A5 are aligned with all five recesses R1-R5 in the selector ring 94, respectively. Therefore, when the spindle 18 is slid rearward relative to the transmission housing 30 in response to contact with a workpiece, the chamfered edge 54 of the first bearing 50 displaces the balls 98 situated in the respective apertures A1-A5 radially outward and partially into the recesses R1-R5, thereby disabling the hammer lockout mechanism 90. Thus, the first ratchet 42 is permitted to engage with the second ratchet 46 to impart reciprocation to the spindle 18 as it rotates.

As the spindle 18 reciprocates during "hammer drill" mode, the first bearing 50 reciprocates within the cavity 106, causing the outer race 52 of the first bearing 50 to move along the inner surface 103 of the annular portion 102. Because the outer race 52 slides along the sleeve bushing 105, which is formed of a harder material than the rest of the annular portion 102, the longevity of the transmission housing 30, and the inner surface 103 of the annular portion 102 in particular, is increased compared to a transmission housing 30 without the sleeve bushing 105. Through testing, it has been found that in absence of the bushing 105, the spindle 18 experiences wobble at 6,000 reciprocation cycles of the bearing 50. But, when the bushing 105 is used, the spindle 18 does not experience wobble even after 14,000 reciprocation cycles of the bearing 50. The sleeve bushing 105 wears at a much lower rate than the inner surface 103 of the annular portion 102, thus maintaining alignment of the spindle 18 with the longitudinal axis 108 of the hammer drill 10 throughout a longer period of the useful life of the hammer drill 10.

When the collar 74 and selector ring 94 are incrementally rotated (e.g., by 18 degrees) in a counterclockwise direction to the second rotational position shown in FIGS. 6 and 7, none of the apertures A1-A5 are aligned with the recesses R1-R5. Thus, in this position of the collar 74 and selector ring 94, the balls 98 in the respective apertures A1-A5 are prevented from being radially displaced into the recesses R1-R5 in response to the spindle 18 contacting a workpiece (via the chuck 34 and an attached drill or tool bit). Rather, the chamfered edge 54 of the first bearing 50 presses against the balls 98, which in turn abut against the inner periphery 112 of the selector ring 94 and are inhibited from displacing radially outward. Thus, the spindle 18 is prevented from moving rearward, maintaining a gap 110 between the first and second ratchets 42, 46. Thus, in the second rotational position of the collar 74 and the selector ring 94, the hammer lockout mechanism 90 is enabled, preventing the spindle 18 from reciprocating in an axial manner as it is rotated by the drive mechanism 14, operating the hammer drill 10 in a "drill only" mode.

There are a total of twenty different positions between which the collar 74 and selector ring 94 can rotate, such that the collar 74 is rotated 18 degrees between each of the positions. The wiper is in electrical and sliding contact with the PCB 82 as the collar 74 is rotated between each of the twenty positions. Depending upon which of the electrical pads 86 on the PCB 82 the wiper contacts, the electronic clutch 78 adjusts which clutch setting to apply to the motor 22. In the "hammer drill" mode and the "drill only" mode coinciding with the first and second rotational positions of the collar 74 and selector ring 94, respectively, the electronic clutch 78 operates the motor 22 to output torque at a predetermined maximum value to the spindle 18. In some embodiments, the predetermined maximum value of torque output by the motor 22 may coincide with the maximum rated torque of the motor 22.

As shown in FIG. 5 and the Table below, the "hammer drill" position of the collar 74 corresponds to a "0 degree" or "first rotational position" position of the collar 74, in which the recesses R1, R2, R3, R4, R5 of the selector ring 94 are respectively and approximately located at 0, 55, 145, 221, and 305 degrees counterclockwise from the plane 104, such that the apertures A1, A2, A3, A4, A5 are thereby aligned. When the collar 74 is rotated 18 degrees counterclockwise from the "hammer drill" position to the "drill only" or "second rotational position" as shown in FIG. 7, the recesses R1, R2, R3, R4, R5 are respectively and approximately located at 18 degrees, 73 degrees, 163 degrees, 239 degrees, and 323 degrees counterclockwise from the plane 104.

As shown in the Table below and in FIGS. 8-25, the operator may continue to cycle through eighteen additional rotational positions of the collar 74, each corresponding to a different clutch setting in "screwdriver mode", by incrementally rotating the collar 74 counterclockwise by 18 degrees each time. The first clutch setting (FIG. 8) provides a torque limit that is slightly less than the predetermined maximum value of torque output by the motor 22 available in the "hammer drill" mode or the "drill only" mode. As the clutch setting number numerically increases, the torque threshold applied to the motor 22 decreases, with the eighteenth clutch setting (shown in FIG. 25) providing the lowest torque limit to the motor 22.

As can be seen in FIGS. 5 and 7-25, and the Table below, the "hammer drill" position in FIG. 5 is the only position in which all five apertures A1-A5 are aligned with all five recesses R1-R5, thereby disabling the hammer lockout mechanism 90 as described above. In every other setting of the collar 74 and selector ring 94, no more than two of any of the apertures A1-A5 are aligned with the recesses R1-R5. Therefore, in "drill-only" mode (FIG. 7) and "screwdriver mode" (FIGS. 8-25, clutch settings 1-18), at least three balls 98 inhibit the rearward movement of the spindle 18, via the first bearing 50, thereby enabling the hammer lockout mechanism 90 and preventing axial reciprocation of the spindle 18 as it rotates.

| Degrees of collar rotation | A1 | A2 | A3 | A4 | A5 | Balls in recesses | Mode/Clutch Setting | FIG. |
|---|---|---|---|---|---|---|---|---|
| | Aperture is aligned with which recess? | | | | | | | |
| 0 | R1 | R2 | R3 | R4 | R5 | 5 | Hammer Drill | 5 |
| 18 | — | — | — | — | — | 0 | Drill Only | 7 |
| 36 | — | — | — | — | — | 0 | 1 | 8 |
| 54 | R5 | R1 | — | — | — | 2 | 2 | 9 |
| 72 | — | — | — | R3 | R4 | 2 | 3 | 10 |
| 90 | — | — | R2 | — | R4 | 2 | 4 | 11 |
| 108 | — | R5 | — | — | — | 1 | 5 | 12 |
| 126 | — | — | — | — | — | 0 | 6 | 13 |
| 144 | R4 | — | R1 | — | — | 2 | 7 | 14 |
| 162 | — | — | — | R2 | R3 | 2 | 8 | 15 |
| 180 | — | — | — | — | — | 0 | 9 | 16 |
| 198 | — | R4 | R5 | — | — | 2 | 10 | 17 |
| 216 | R3 | — | — | R1 | — | 2 | 11 | 18 |
| 234 | — | — | — | — | — | 0 | 12 | 19 |
| 252 | — | — | — | — | R2 | 1 | 13 | 20 |
| 270 | — | R3 | — | R5 | — | 2 | 14 | 21 |
| 288 | — | — | R4 | R5 | — | 2 | 15 | 22 |
| 306 | R2 | — | — | — | R1 | 2 | 16 | 23 |
| 324 | — | — | — | — | — | 0 | 17 | 24 |
| 342 | — | — | — | — | — | 0 | 18 | 25 |
| 360 | R1 | R2 | R3 | R4 | R5 | 5 | Hammer Drill | 5 |

To adjust the hammer drill 10 between "screwdriver" mode, "drill only" mode, and "hammer drill" mode, the collar 74 may be rotated a full 360 degrees and beyond in a single rotational direction, clockwise or counterclockwise, without any stops which would otherwise limit the extent to which the collar 74 may be rotated. Therefore, if the operator is using the hammer drill 10 in "screwdriver mode" on the eighteenth clutch setting (FIG. 25), the operator needs only to rotate the collar 74 counterclockwise by an additional 18 degrees to switch the hammer drill 10 into "hammer drill" mode, rather than rotating the collar 74 in an opposite (clockwise) direction back through clutch settings 17 to 1 and "drill only" mode.

Various features of the invention are set forth in the following claims.

What is claimed is:

1. A rotary power tool comprising:

a drive mechanism including an electric motor and a transmission;

a housing enclosing at least a portion of the drive mechanism;

a spindle rotatable in response to receiving torque from the drive mechanism;

a first ratchet coupled for co-rotation with the spindle;

a second ratchet rotationally fixed to the housing;

a sleeve bushing supported by the housing; and a bearing rotatably supporting the spindle, the bearing having an outer race, wherein the spindle is movable relative the housing in response to contact with a workpiece, causing the first and second ratchets to engage and the spindle to reciprocate while rotating, wherein the outer race of the bearing moves along the sleeve bushing during reciprocation of the spindle when the first ratchet and second ratchet are engaged, and wherein the sleeve bushing is formed of a first material and the housing is formed of a second material that is softer than the first material.

2. The rotary power tool of claim 1, wherein the first ratchet and the bearing are set within a cavity defined within the housing.

3. The rotary power tool of claim 1, wherein the housing includes an annular portion, wherein the sleeve bushing is supported by the annular portion, and wherein the spindle is movable relative to the annular portion.

4. The rotary power tool of claim 1, wherein the housing is at least partially formed of aluminum.

5. The rotary power tool of claim 1, wherein the sleeve bushing is press fit with the housing.

6. The rotary power tool of claim 1, further comprising a hammer lockout mechanism adjustable between a first mode and a second mode, the hammer lockout mechanism including an aperture in the housing and a detent radially movable within the aperture between a locking position and an unlocking position, wherein, in the first mode, the detent is moveable from the locking position to the unlocking position, such that the spindle is movable relative to the housing in response to contact with a workpiece, causing the first and second ratchets to engage, and wherein, in the second mode, the detent is prevented from moving from the locking position to the unlocking position, such that the spindle is blocked by the detent from moving relative to the housing in response to contact with a workpiece and a gap is maintained between the first and second ratchets.

7. The rotary power tool of claim 6, wherein at least a portion of the sleeve bushing is arranged in front of the aperture, such that no portion of the sleeve bushing intersects the aperture.

8. A rotary power tool comprising:

a drive mechanism including an electric motor and a transmission;

a housing enclosing at least a portion of the drive mechanism;

a spindle rotatable in response to receiving torque from the drive mechanism;

a first ratchet coupled for co-rotation with the spindle;

a second ratchet rotationally fixed to the housing;

a sleeve bushing supported by the housing; and a bearing rotatably supporting the spindle, the bearing having an outer race, wherein the spindle is movable relative the housing in response to contact with a workpiece, causing the first and second ratchets to engage and the spindle to reciprocate while rotating, wherein the outer race of the bearing moves along the sleeve bushing during reciprocation of the spindle when the first ratchet and second ratchet are engaged, and wherein the sleeve bushing is shrink fit with the housing.

9. A rotary power tool comprising:

a drive mechanism including an electric motor and a transmission;

a housing enclosing at least a portion of the drive mechanism, the housing including an annular portion;

a spindle rotatable in response to receiving torque from the drive mechanism;

a first ratchet coupled for co-rotation with the spindle;

a second ratchet rotationally fixed to the housing;

a sleeve bushing disposed between the spindle and the housing; and a bearing rotatably supporting the spindle, wherein the spindle is movable relative to the annular portion of the housing in response to contact with a workpiece, causing the first and second ratchets to engage and the spindle to reciprocate while rotating, wherein the bearing moves along the sleeve bushing during reciprocation of the spindle when the first ratchet and second ratchet are engaged, and wherein the sleeve bushing is formed of a first material and the housing is formed of a second material that is softer than the first material.

10. The rotary power tool of claim 9, wherein the sleeve bushing is formed of steel.

11. The rotary power tool of claim 10, wherein the housing is at least partially formed of aluminum.

12. The rotary power tool of claim 9, wherein the first ratchet and the bearing are set within a cavity defined within the annular portion of the housing.

13. The rotary power tool of claim 9, wherein the sleeve bushing is press fit within the annular portion of the housing.

14. The rotary power tool of claim 9, further comprising a hammer lockout mechanism adjustable between a first mode and a second mode, the hammer lockout mechanism including an aperture in the housing and a detent radially movable within the aperture between a locking position and an unlocking position, wherein, in the first mode, the detent is moveable from the locking position to the unlocking position such that the spindle is movable relative to the housing in response to contact with a workpiece, causing the first and second ratchets to engage, and wherein, in the second mode, the detent is prevented from moving from the locking position to the unlocking position, such that the spindle is blocked by the detent from moving relative to the housing in response to contact with a workpiece and a gap is maintained between the first and second ratchets.

15. The rotary power tool of claim 14, wherein at least a portion of the sleeve bushing is arranged in front of the aperture, such that no portion of the sleeve bushing intersects the aperture.

16. The rotary power tool of claim 9, wherein an outer race of the bearing moves along the sleeve bushing during reciprocation of the spindle.

17. The rotary power tool of claim 9, wherein an inner race of the bearing is coupled to the spindle.

18. The rotary power tool of claim 9, wherein the bearing rotatably supports the spindle at a position further from the electric motor than the first ratchet.

* * * * *